United States Patent
Amari

(10) Patent No.: US 10,384,552 B2
(45) Date of Patent: Aug. 20, 2019

(54) POWER TRANSMISSION AND RECEPTION SYSTEM FOR VEHICLE WITH GRAPHICAL ALIGNMENT

(71) Applicant: HONDA MOTOR CO., LTD., Tokyo (JP)

(72) Inventor: Yusaku Amari, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 15/497,462

(22) Filed: Apr. 26, 2017

(65) Prior Publication Data

US 2017/0313202 A1    Nov. 2, 2017

(30) Foreign Application Priority Data

Apr. 27, 2016  (JP) ................ 2016-089810

(51) Int. Cl.
*B60L 53/37* (2019.01)
*B60L 53/38* (2019.01)
(Continued)

(52) U.S. Cl.
CPC ......... *B60L 11/1829* (2013.01); *B60L 53/36* (2019.02); *B60L 53/37* (2019.02); *B60L 53/38* (2019.02); *B60L 53/665* (2019.02); *B60L 2240/24* (2013.01); *B60L 2240/62* (2013.01); *B60L 2250/16* (2013.01); *Y02T 10/7005* (2013.01); *Y02T 10/7072* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(58) Field of Classification Search
None
See application file for complete search history.

(56) References Cited

U.S. PATENT DOCUMENTS 6,091,956 A * 7/2000 Hollenberg ............ G06Q 30/02
                                                        455/456.5
9,365,104 B2    6/2016 Ichikawa
(Continued)

FOREIGN PATENT DOCUMENTS

WO    2011/132271 A1    10/2011

*Primary Examiner* — David V Henze-Gongola
(74) *Attorney, Agent, or Firm* — Westerman, Hattori, Daniels & Adrian

(57) ABSTRACT

A power reception apparatus includes a secondary coil which receives electric power in a non-contact manner from a primary coil which is disposed on a plane defined by a front-rear direction and a left-right direction which are at right angles to each other, a drive part which can change a relative position on the plane of the secondary coil relative to the primary coil, a display unit, and a processing unit for processing an image to be displayed on the display unit. In an event that the secondary coil is included in the target zone in relation to the left-right direction, the processing unit displays the relative position and the gradient of the secondary coil on the display unit, and changes display modes of displaying the relative position on the display unit according to a change in the relative position in the front-rear direction.

17 Claims, 19 Drawing Sheets

(51) Int. Cl.
*B60L 11/18* (2006.01)
*B60L 53/36* (2019.01)
*B60L 53/66* (2019.01)

(56) References Cited

U.S. PATENT DOCUMENTS

| | | | | |
|---|---|---|---|---|
| 2010/0161217 | A1* | 6/2010 | Yamamoto | B60L 3/0046 |
| | | | | 701/408 |
| 2012/0262002 | A1* | 10/2012 | Widmer | H02J 5/005 |
| | | | | 307/104 |
| 2013/0038715 | A1 | 2/2013 | Ichikawa | |
| 2015/0015193 | A1* | 1/2015 | Oman | B60L 11/1829 |
| | | | | 320/108 |
| 2015/0155095 | A1* | 6/2015 | Wu | H02J 17/00 |
| | | | | 307/104 |
| 2015/0286880 | A1* | 10/2015 | Itou | B60L 11/1829 |
| | | | | 348/148 |
| 2016/0023565 | A1* | 1/2016 | Bell | B60L 11/1833 |
| | | | | 320/109 |

\* cited by examiner

| | First display mode (when $\Delta x \geq th1$) (Refer to Fig. 12) | Second display mode (when $\Delta t < th1$) (Refer to Figs. 15 to 17) |
|---|---|---|
| Information in relation to left-right direction | ◯<br>• Display lateral deviation $\Delta x$<br>• Execute relative display in left-right direction | ✕<br>• Display no lateral deviation $\Delta x$<br>• Execute no relative display in left-right direction |
| Information in relation to front-rear direction | △<br>• Display no longitudinal deviation $\Delta y$<br>• Execute relative display in front-rear direction | ◯<br>• Display index according to longitudinal deviation $\Delta y$<br>• Execute relative display in front-rear direction |
| Reflecting yaw angle of secondary coil | ◯<br>Executed normally | △<br>• Reflect no yaw angle while secondary coil stays in target zone (Refer to Fig. 15)<br>• Reflect yaw angle of secondary coil when secondary coil deviates from target zone (Refer to Fig. 16) |
| Execution of enlarged display | ✕<br>Not executed | ◯<br>Executed according to longitudinal deviation $\Delta y$ (Refer to Fig. 17) |

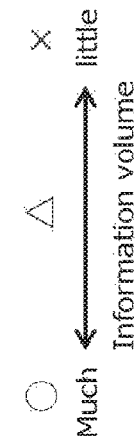

◯   △   ✕
Much ←——→ little
Information volume

FIG. 18

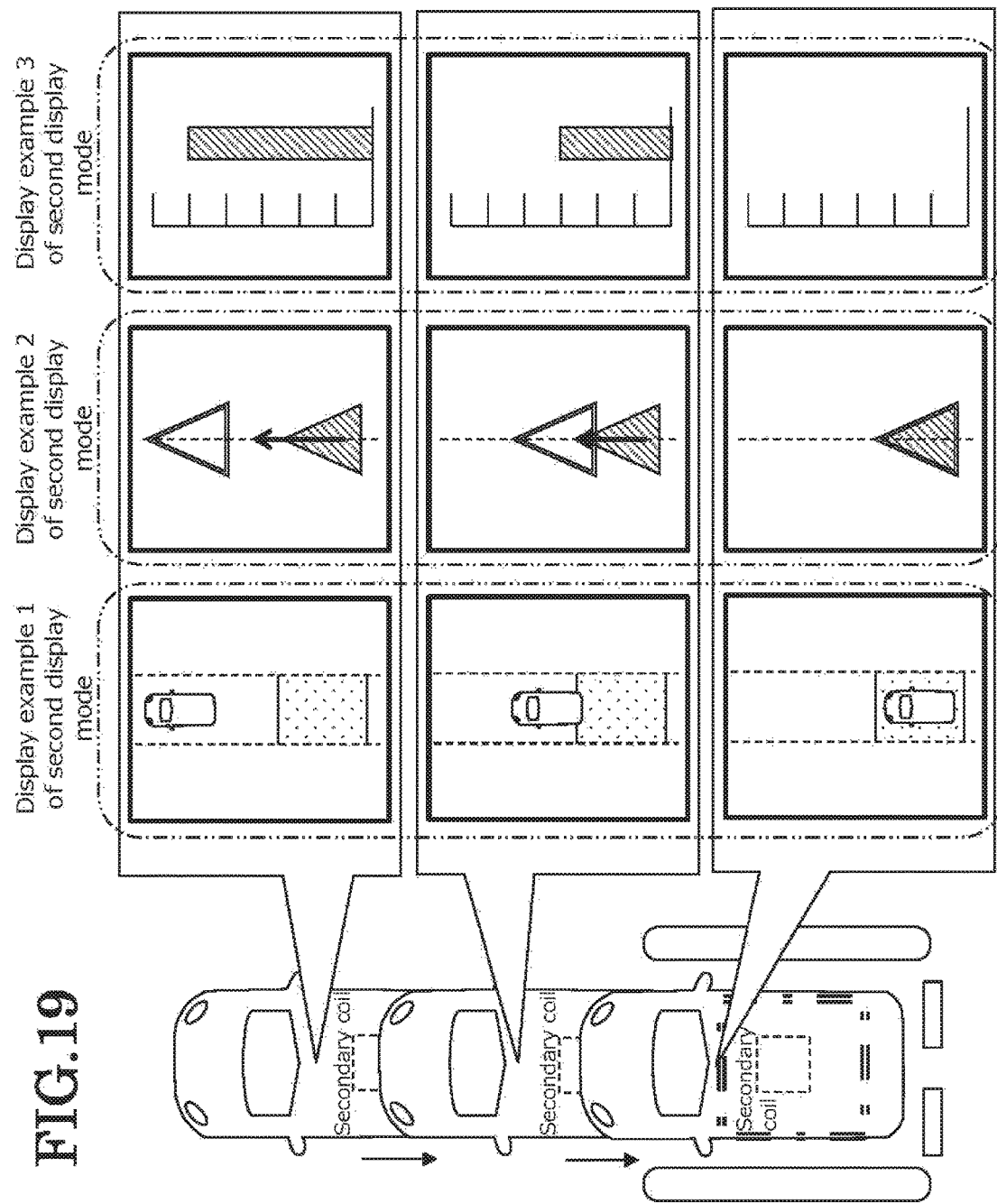

POWER TRANSMISSION AND RECEPTION SYSTEM FOR VEHICLE WITH GRAPHICAL ALIGNMENT

CROSS REFERENCE TO RELATED APPLICATIONS

This application is based on Japanese Patent Application (No. 2016-089810) filed on Apr. 27, 2016, the contents of which are incorporated herein by reference.

BACKGROUND OF THE INVENTION

1. Field of the Invention

The present invention relates to a power reception apparatus, vehicle, a power transmission apparatus, a power transmission and reception system, and a control method for supporting a positional alignment between a transmitting unit and a receiving unit before execution of power feeding using a non-contact power transmission technology (hereinafter, referred to as a "non-contact power feeding").

2. Description of the Related Art

The industry has been focusing on the non-contact power transmission technology that takes the usability in charging into consideration as a technology for charging a battery installed on a vehicle such as a hybrid electric vehicle or an electric vehicle that is driven by an electric motor. In the case of this technology being used, however, it is important from the viewpoint of improving the power transmission efficiency and reducing the leakage magnetic filed to align properly a transmitting unit provided at a power feeding facility with a receiving unit equipped on a vehicle.

Patent literature 1 describes a parking support system for improving accuracy in parking a vehicle at a power feeding facility. In this parking support system, the vehicle is controlled to be steered based on an image captured by a camera so as to be guided to a transmitting unit of the power feeding facility, and when the vehicle is guided to a position determined in advance relative to the transmitting unit, the speed of the vehicle is controlled based on a receiving situation of the receiving unit to thereby execute a positional alignment of the transmitting unit with the receiving unit.

PRIOR ART LITERATURE

Patent Literature

[Patent Literature 1] International Publication No. 2011/132271

Incidentally, a plug-in charging function needs to be provided as well on an actual electric or hybrid electric vehicle as a function to charge an on-board battery thereof, even though the vehicle is equipped with such a non-contact power feeding function, until power feeding facilities where the non-contact power feeding is possible have been propagated sufficiently. In these circumstances, it is desirable that the equipment for charging the on-board battery mounded on electric or hybrid electric vehicles appropriately provided in the view point of cost and the number of parts. In the parking support system described in patent literature 1 above, the parking accuracy is improved by executing a so-called automatic driving which involves the functions of steering control and speed control. However, it is not preferable mainly from the view point of cost to mount the equipment for automatic driving only for alignment in position of the transmitting unit of the feeding facility with the receiving unit of the vehicle.

Thus, it is desirable to provide positional alignment supports by other parking support systems than the one involving the automatic driving. However, when a driver is required to park his or her vehicle more accurately for charging the on-board battery through the non-contact feeding technique than when he or she parks the vehicle normally, this increases the number of labor hours in parking the vehicle in the required manner, which is not preferable from the viewpoint of usability. In this way, in enabling the driver to park the vehicle so as to align in position the receiving unit of the vehicle with the transmitting unit of the feeding facility for charging the battery through the non-contact feeding, it is required that the compatibility between parking accuracy and usability can be realized with a low-cost apparatus.

SUMMARY OF THE INVENTION

An object of the invention is to provide a power reception apparatus, vehicle, a power transmission apparatus, a power transmission and reception system, and a control method which enable a positional alignment with appropriate accuracy easily and at low cost.

With a view to achieving the object, according to an invention of (1), there is disposed a power reception apparatus including:

a secondary coil (for example, a secondary coil 105 described in an embodiment which will be described later) which receives electric power in a non-contact manner from a primary coil (for example, a primary coil 11 in the embodiment) which is disposed on a plane defined by a front-rear direction and a left-right direction which are at right angles to each other;

a drive part (for example, a drive part 101 in the embodiment) for changing a relative position of the secondary coil on the plane relative to the primary coil;

a display unit (for example, a display unit 107 in the embodiment); and a processing unit (for example, an ECU 109 in the embodiment) for processing an image to be displayed on the display unit, wherein the processing unit determines a target zone on the plane which includes the primary coil, the processing unit calculates the relative position and a gradient of the secondary coil relative to the primary coil based on a coupling coefficient between the primary coil and the secondary coil, and a change with time in the coupling coefficient, and in an event that the secondary coil is included in the target zone in relation to the left-right direction, the processing unit displays information on the relative position and information on the gradient of the secondary coil or a corrected gradient of the secondary coil on the display unit, and changes a display mode of displaying the information on the relative position which is displayed on the display unit according to a change in the relative position in relation to the front-rear direction.

Here, the term described in the specification will be complemented as below. The "display unit" is a general electronic medium for displaying the image processed by the processing unit and hence does not have to be a special device. A display of a car navigation system, a display provided separately from the car navigation system and a screen of a portable terminal or a tablet are included as a specific example of the "display unit." However, the "display unit" is not limited thereto. The complementary description made above will be true with features of the invention which will be described herebelow.

In addition, the description reading that "in an event that the secondary coil is included in the target zone in relation to the left-right direction" denotes a case where the secondary coil is included in the target zone in relation to the left-right (transverse) direction whether or not the secondary coil is included in the target zone in relation to a front-rear (longitudinal) direction. In other words, the description denotes a case where the secondary coil is included in an imaginary zone resulting from expanding the target zone in the front-rear direction or the target zone. The complementary description made above will be true with features of the invention which will be described herebelow.

According to an invention of (2), there is provided a power reception apparatus including:

a secondary coil (for example, the secondary coil 105 in the embodiment) which receives electric power in a non-contact manner from a primary coil (for example, the primary coil 11 in the embodiment) which is disposed on a plane defined by a front-rear direction and a left-right direction which are at right angles to each other;

a drive part (for example, the drive part 101 in the embodiment) for changing a relative position of the secondary coil on the plane relative to the primary coil;

a display unit (for example, the display unit 107 in the embodiment);

a processing unit (for example, the ECU 109 in the embodiment) for processing an image to be displayed on the display unit; and an acquisition unit (for example, a short range wireless unit 111 and a GPS processing unit 113 in the embodiment) for acquiring information on a position of the primary coil and information on a position of the secondary coil, wherein the processing unit determines a target zone on the plane which includes the primary coil, the processing unit calculates the relative position and a gradient of the secondary coil relative to the primary coil based on each position information of the primary coil and the secondary coil which are acquired by the acquisition unit, and a change with time in the information on the positions of the primary and secondary coils, and in an event that the secondary coil is included in the target zone in relation to the left-right direction, the processing unit displays information on the relative position and information on the gradient of the secondary coil or a corrected gradient of the secondary coil on the display unit, and changes a display mode of displaying the information on the relative position which is displayed on the display unit according to a change in the relative position in relation to the front-rear direction.

According to an invention of (3), in the invention of (1), in an event that the secondary coil is included in the target zone in relation to the left-right direction, the processing unit enlarges the display mode of displaying information on the relative position which is displayed on the display unit greater as a distance in the front-rear direction between the primary coil and the secondary coil which is represented by the relative position becomes shorter.

According to an invention of (4), in the invention of (1), the processing unit displays information on the target zone on the display unit.

According to an invention of (5), in the invention of (1), the processing unit calculates the gradient of the secondary coil based on a change with time in information on the relative position in relation to the left-right direction and a change with time in information on the relative position in relation to the front-rear direction.

According to an invention of (6), in the invention of (1), in an event that the secondary coil is included in the target zone in relation to the left-right direction, the processing unit assumes whether or not the secondary coil is included in the target zone based on the relative position and the gradient of the secondary coil when the secondary coil shifts to a position where the secondary coil is included in the target zone in relation to the front-rear direction, and in an event that it assumes that the secondary coil is not included in the target zone, the processing unit displays the information on the relative position and the information on the gradient of the secondary coil on the display unit.

According to an invention of (7), in the invention of (1), in an event that the secondary coil is included in the target zone in relation to the left-right direction, the processing unit assumes whether or not the secondary coil is included in the target zone based on the relative position and the gradient of the secondary coil when the secondary coil shifts to a position where the secondary coil is included in the target zone in relation to the front-rear direction, and in an event that it assumes that the secondary coil is included in the target zone, the processing unit displays the information on the relative position and information on reduced gradient of the secondary coil on the display unit.

According to an invention of (8), in the invention of (7), the information on reduced gradient of the secondary coil is information indicating that a gradient of the secondary coil relative to the primary coil is almost 0 degree.

According to an invention of (9), in the invention of (1), in an event that the secondary coil is included in the target zone in relation to the left-right direction, the processing unit processes to display information on the relative position in relation to the front-rear direction more than information on the relative position in relation to the left-right direction.

According to an invention of (10, in the invention of (1), in an event that the secondary coil is included in the target zone in relation to the left-right direction, the processing unit processes to display only information on the relative position in relation to the front-rear direction as the information on the relative position.

According to an invention of (11), in the invention of (1), the information on the relative position includes information indicating the relative position by a figure, and the information on the gradient of the secondary coil or the corrected gradient of the secondary coil includes information indicating a gradient of the secondary coil relative to the primary coil by a figure.

According to an invention of (12), there is provided a vehicle having the power reception apparatus of (1).

According to an invention of (13), there is provided a power transmission apparatus including:

a primary coil (for example, the primary coil 11 in the embodiment) which is disposed on a plane defined by a front-rear direction and a left-right direction which are at right angles to each other;

a transmitting unit for transmitting information to a power reception apparatus having a secondary coil (for example, the secondary coil 105 in the embodiment) which receives electric power in a non-contact manner from the primary coil, a drive part (for example, the drive part 101 in the embodiment) for changing a relative position of the secondary coil on the plane relative to the primary coil, and a display unit (for example, the display unit 107 in the embodiment); and a processing unit for processing an image to be displayed on the display unit of the power reception apparatus, wherein the processing unit determines a target zone on the plane which includes the primary coil, the processing unit calculates the relative position and a gradient of the secondary coil relative to the primary coil based on a coupling coefficient between the primary coil and the secondary coil, and a change with time in the coupling coefficient, the transmitting unit transmits information on the relative position and information on the gradient of the secondary coil or a corrected gradient of the secondary coil to the power reception apparatus, and in an event that the secondary coil is included in the target zone in relation to the left-right direction, the information on the relative position and the information on the gradient of the secondary coil or the corrected gradient of the secondary coil are displayed on the display unit of the power reception apparatus, and a display mode of displaying the information on the relative position which is displayed on the display unit is changed according to a change in the relative position in relation to the front-rear direction.

According to an invention of (14), there is provided a power transmission apparatus including:

a primary coil (for example, the primary coil 11 in the embodiment) which is disposed on a plane defined by a front-rear direction and a left-right direction which are at right angles to each other;

a transmitting unit for transmitting information to a power reception apparatus having a secondary coil (for example, the secondary coil 105 in the embodiment) which receives electric power in a non-contact manner from the primary coil, a drive part (for example, the drive part 101 in the embodiment) for changing a relative position of the secondary coil on the plane relative to the primary coil, and a display unit (for example, the display unit 107 in the embodiment);

a processing unit for processing an image to be displayed on the display unit of the power reception apparatus; and an acquisition unit for acquiring information on a position of the primary coil and information on a position of the secondary coil, wherein the processing unit determines a target zone on the plane which includes the primary coil, the processing unit calculates the relative position and a gradient of the secondary coil relative to the primary coil based on each position information of the primary coil and the secondary coil which are acquired by the acquisition unit, and a change with time in the information on the positions of the primary and secondary coils, the transmitting unit transmits information on the relative position and information on the gradient of the secondary coil or a corrected gradient of the secondary coil to the power reception apparatus, and in an event that the secondary coil is included in the target zone in relation to the left-right direction, the information on the relative position and the information on the gradient of the secondary coil or the corrected gradient of the secondary coil are displayed on the display unit of the power reception apparatus, and a display mode of displaying the information on the relative position which is displayed on the display unit is changed according to a change in the relative position in relation to the front-rear direction.

According to an invention of (15), there is provided a power transmission and reception system including:

a primary coil (for example, the primary coil 11 in the embodiment) which is disposed on a plane defined by a front-rear direction and a left-right direction which are at right angles to each other;

a secondary coil (for example, the secondary coil 105 in the embodiment) which receives electric power in a non-contact manner from the primary coil;

a drive part (for example, the drive part 101 in the embodiment) for changing a relative position of the secondary coil on the plane relative to the primary coil;

a display unit (for example, the display unit 107 in the embodiment); and a processing unit (for example, the ECU 109 in the embodiment) for processing an image to be displayed on the display unit, wherein the processing unit determines a target zone on the plane which includes the primary coil, the processing unit calculates the relative position and a gradient of the secondary coil relative to the primary coil based on a coupling coefficient between the primary coil and the secondary coil, and a change with time in the coupling coefficient, and in an event that the secondary coil is included in the target zone in relation to the left-right direction, the processing unit displays information on the relative position and information on the gradient of the secondary coil or a corrected gradient of the secondary coil on the display unit, and changes a display mode of displaying information on the relative position which is displayed on the display unit according to a change in the relative position in relation to the front-rear direction.

According to an invention of (16), there is provided a power transmission and reception system including:

a primary coil (for example, the primary coil 11 in the embodiment) which is disposed on a plane defined by a front-rear direction and a left-right direction which are at right angles to each other;

a secondary coil (for example, the secondary coil 105 in the embodiment) which receives electric power in a non-contact manner from the primary coil;

a drive part (for example, the drive part 101 in the embodiment) for changing a relative position of the secondary coil on the plane relative to the primary coil;

a display unit (for example, the display unit 107 in the embodiment);

a processing unit (for example, the ECU 109 in the embodiment) for processing an image to be displayed on the display unit;

an acquisition unit (for example, the short range wireless unit 111 and the GPS processing unit 113 in the embodiment) for acquiring information on a position of the primary coil and information on a position of the secondary coil, wherein the processing unit determines a target zone on the plane which includes the primary coil, the processing unit calculates the relative position and a gradient of the secondary coil relative to the primary coil based on each position information of the primary coil and the secondary coil which are acquired by the acquisition unit, and a change with time in the information on the positions of the primary and secondary coils, and in an event that the secondary coil is included in the target zone in relation to the left-right direction, the processing unit displays information on the relative position and information on the gradient of the secondary coil or a corrected gradient of the secondary coil on the display unit, and changes a display mode of displaying information on the relative position which is displayed on the display unit according to a change in the relative position in relation to the front-rear direction.

According to an invention of (17), there is provided a control method for supporting an alignment in position of a secondary coil (for example, the secondary coil 105 in the embodiment), which receives electric power in a non-contact manner from a primary coil (for example, the primary coil 11 in the embodiment) which is disposed on a plane defined by a front-rear direction and a left-right direction which are at right angles to each other, with the primary coil by means of an image which is displayed on a display unit (for example, the display unit 107 in the embodiment), including the steps of:

determining a target zone on the plane which includes the primary coil;

calculating a relative position of the secondary coil on the plane relative to the primary coil which is changed by a drive part (for example, the drive part 101 in the embodiment) for changing the relative position and a gradient of the secondary coil relative to the primary coil based on a coupling coefficient between the primary coil and the secondary coil, and a change with time in the coupling coefficient; and in an event that the secondary coil is included in the target zone in relation to the left-right direction, displaying information on the relative position and information on the gradient of the secondary coil or a corrected gradient of the secondary coil on the display unit, and changing a display mode of displaying information on the relative position on the display unit according to a change in the relative position in relation to the front-rear direction.

According to an invention of (18), there is provided a control method for supporting an alignment in position of a secondary coil (for example, the secondary coil 105 in the embodiment), which receives electric power in a non-contact manner from a primary coil (for example, the primary coil 11 in the embodiment) which is disposed on a plane defined by a front-rear direction and a left-right direction which are at right angles to each other, with the primary coil by means of an image which is displayed on a display unit (for example, the display unit 107 in the embodiment), including the steps of:

determining a target zone on the plane which includes the primary coil;

calculating a relative position of the secondary coil on the plane relative to the primary coil which is changed by a drive part (for example, the drive part 101 in the embodiment) for changing the relative position and a gradient of the secondary coil relative to the primary coil based on information on the position of the primary coil and information on the position of the secondary coil which are acquired by an acquisition unit (for example, the short range wireless unit 111 and the GPS processing unit 113 in the embodiment) for acquiring each position information of the primary coil and the secondary coil, and a change with time in the information on the positions of the primary and secondary coils; and in an event that the secondary coil is included in the target zone in relation to the left-right direction, displaying information on the relative position and information on the gradient of the secondary coil or a corrected gradient of the secondary coil on the display unit, and changing a display mode of displaying the information on the relative position on the display unit according to a change in the relative position in relation to the front-rear direction.

Advantages of the Invention

According to the invention of (1), (2), and (12) to (18), in aligning the secondary coil with the primary coil, in the event that the secondary coil is included in the target zone in relation to the left-right direction, which constitutes a critical aspect of the alignment in the front-rear direction, since the display modes of relative position which is displayed on the display unit are changed, the operator who operates the drive part can grasp accurately the state of the secondary coil relative to the primary coil by watching the screen of the display unit. Consequently, the operator can easily execute the accurate alignment of the secondary coil with the first coil particularly in the aspect where the alignment in the front-rear direction is critical by operating the drive part while watching the screen of the display unit. Further, the invention can be realized in a case where a device for measuring a coupling coefficient between the primary coil and the secondary coil or a device for acquiring information on the positions of the primary coil and the secondary coil is provided in addition to the display unit. Thus, the support for the positional alignment is executed at low cost.

According to the invention of (3), in the event that the secondary coil is included in the target zone in relation to the left-right direction, the relative position is displayed as being enlarged greater as the secondary coil approaches the primary coil in the front-rear direction as a result of the display modes being changed. Consequently, the operator can easily execute the alignment of the secondary coil with the first coil with appropriate accuracy particularly in the aspect where the alignment in the front-rear direction is critical by operating the drive part while watching the screen of the display unit.

According to the invention of (4), the target zone where the secondary coil is aligned with the primary coil is displayed on the display unit when the aligning operation is executed in addition to the relative position and the gradient of the secondary coil. This enables the operator to execute easily the alignment with appropriate accuracy by operating the drive part so that the secondary coil is included in the target zone while watching the screen of the display unit.

According to the invention of (5), the gradient of the secondary coil is calculated based on the change with time in the information on the relative position in relation to the left-right direction and the change with time in the information on the relative position in relation to the front-rear direction. In this way, the accurate gradient of the secondary coil can be acquired without using a special sensor by calculating the gradient based on the changes with time in the information on the relative position which is resolved into the left-right direction and the front-rear direction.

According to the invention of (6), in the event that it is assumed that the secondary coil is not included in the target zone when the secondary coil is moved so as to approach the primary coil with the secondary coil included in the target zone in relation to the left-right direction, the information on the gradient of the secondary coil is displayed on the display unit as it is. Namely, when the secondary coil is caused to approach the primary coil from the state where the secondary coil is included in the target zone in relation to the left-right direction, in the event that the secondary coil is displaced greatly in the left-right direction to go out of the target zone, the gradient of the secondary coil becomes critical information to the operator. In this case, the operator of the drive part is requested to execute an alignment with appropriate accuracy by displaying the information on the gradient of the secondary coil as it is. Consequently, the operator can easily execute the alignment with appropriate accuracy.

According to the invention of (7), in the event that it is assumed that the secondary coil is included in the target zone when the secondary coil is moved so as to approach the primary coil with the secondary coil included in the target zone in relation to the left-right direction, the information from which the gradient of the secondary coil is reduced is displayed on the display unit. Namely, even when the secondary coil is caused to approach the primary coil from the state where the secondary coil is included in the target zone in relation to the left-right direction, in the event that the secondary coil is not displaced greatly in the left-right direction to stay in the target zone, the gradient of the secondary coil does not constitute critical information to the operator. In this case, the operator is not requested to execute an alignment with excessive accuracy in the left-right direction by displaying the secondary coil with the degree of gradient thereof reduced on the display unit. Consequently, the operator can easily execute the alignment with appropriate accuracy. In addition, by taking away the information on the gradient of the secondary coil from the information that is to be displayed on the display unit, it is considered that the operator who watches the screen of the display unit tends to concentrate on the longitudinal alignment and hence does nothing about the lateral operation. As a result, it is possible to restrain the operator of the drive part from changing the relative position in the left-right direction.

According to the invention of (8), in the event that the gradient of the secondary coil is not critical information, the operator is not requested at all to execute an alignment with excessive accuracy in the left-right direction by displaying the secondary coil with the degree of gradient thereof reduced on the display unit. Consequently, the operator can easily execute the alignment with appropriate accuracy.

According to the invention of (9), the information on the relative position in relation to the front-rear direction is displayed more than the information on the relative position in relation to the left-right direction on the display unit when the secondary coil is included in the target zone in relation to the left-right direction. The operator of the drive part can grasp the situation where the secondary coil is completely aligned in relation to the left-right direction and hence the secondary coil only has to be aligned in the front-rear direction by watching the information displayed on the screen of the display unit. In addition, since the information on the relative position in relation to the front-rear direction is displayed more than the relative position in relation to the left-right direction on the display unit, it is considered that the operator who watches the screen of the display unit tends to concentrate on the longitudinal alignment and hence does nothing about the lateral alignment operation. As a result, it is possible to restrain the operator of the drive part from changing the relative position in the left-right direction.

According to the invention of (10), in the event that the secondary coil is included in the target zone in relation to the left-right direction, only the information on the relative position in relation to the front-rear direction is displayed on the display unit. The operator of the drive part can grasp the situation where the secondary coil is completely aligned in relation to the left-right direction and hence the secondary coil only has to be aligned in the front-rear direction by watching the information displayed on the screen of the display unit. In addition, since only the information on the relative position in relation to the front-rear direction is displayed on the display unit, it is considered that the operator who watches the screen of the display unit tends to concentrate on the longitudinal alignment and hence does nothing about the lateral alignment operation. As a result, it is possible to restrain the operator of the drive part from changing the relative position in the left-right direction.

According to the invention of (11), since the relative position and the gradient of the secondary coil are displayed by the figures, the operator of the drive part can visually grasp the state of the secondary coil relative to the primary coil.

BRIEF DESCRIPTION OF THE DRAWINGS

FIG. 18 is a chart showing information in relation to a left-right direction, information in relation to a front-rear direction, information on a yaw angle of the secondary coil and how to execute an enlarged display for each of a first display mode which is displayed in step S113 and a second display mode which is displayed in step S123.

FIG. 19 shows other display examples which are displayed on the display unit in the second display mode when the electric vehicle is reversed.

DETAILED DESCRIPTION OF THE EXEMPLARY EMBODIMENTS

Figure 1:
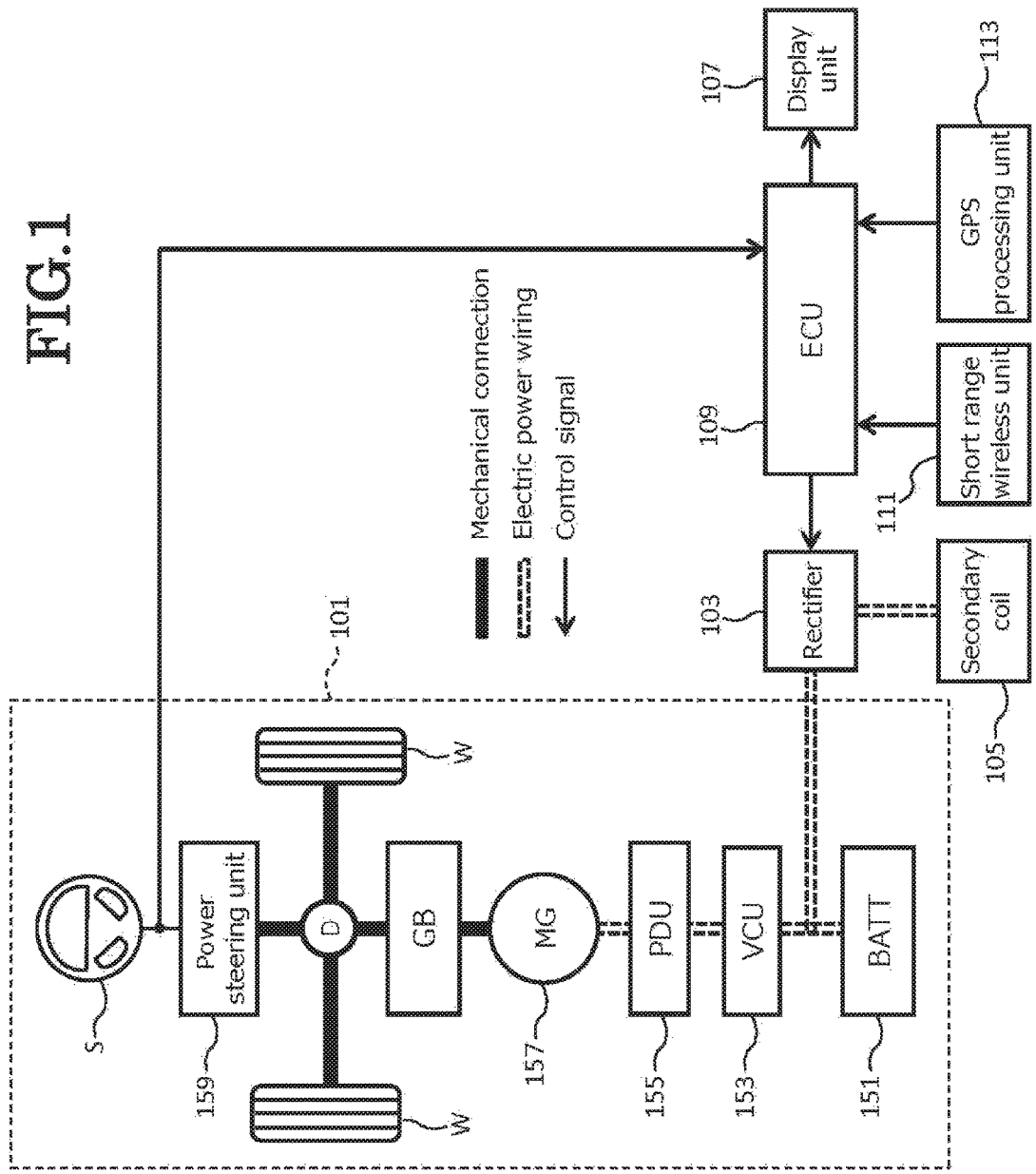
FIG. 1 is a block diagram showing a schematic configuration of an electric vehicle on which a power reception apparatus according to the invention is mounted.

Hereinafter, an embodiment of the invention will be described by reference to the drawings. The drawings should be seen in a direction in which given reference numerals look normal. In the following description, front, rear, left, right, up and down denote accordingly directions as seen from a driver of a vehicle. The front, rear, left, right, up and down sides of the vehicle are denoted by Fr, Rr, L, R, U and D, respectively.

FIG. 1 is a block diagram showing a schematic configuration of an electric vehicle on which a power reception apparatus according to the invention is mounted. In FIG. 1, thick solid lines denote mechanical connections, double dotted lines denote electric power wiring, and thin solid lines with arrows denote control signals. An electric vehicle of a single motor type shown in FIG. 1 includes a drive part 101, a rectifier 103, a secondary coil 105, a display unit 107, an ECU 109, a short range wireless unit 111, and a GPS processing unit 113. Hereinafter, the individual constituent elements of the electric vehicle will be described.

The drive part 101 has, as shown in FIG. 1, a battery (BATT) 151, a VCU (Voltage Control Unit) 153, a PDU (Power Drive Unit) 155, a motor-generator (MG) 157, driving wheels W, a power steering unit 159 and a steering wheel S.

The battery BATT 151 has a plurality of battery cells which are connected in series or parallel and supplies a high voltage in the range of 100 to 200V, for example. The battery cells are, for example, lithium ion battery cells or nickel-metal hydride battery cells. The VCU 153 increases an output voltage of the battery BATT 151 as in the form of a direct current. The PDU 155 converts a direct current voltage into an alternating current voltage and supplies a three-phase current to the motor-generator 157. The motor-generator 157 is driven in by means of electric power supplied thereto from the battery 151 and generates power on which the electric vehicle runs. Torque generated in the motor-generator 157 is transmitted to the driving wheels W by way of a gearbox GB which includes speed changing gears and fixed gears and a differential gear D.

The power steering unit 159 is a mechanism which assists a driver of the electric vehicle in operating the steering wheel S by making use of an electric power steering (EPS) or a hydraulic power steering (HPS). The driving wheels W are steered at a steered angle corresponding to an operation or turning of the steering wheel S by means of the power steering unit 159. The steered angle at which the driving wheels W are steered is an angle formed by a longitudinal axis of the driving wheels W and a longitudinal axis of the electric vehicle.

Figure 2:
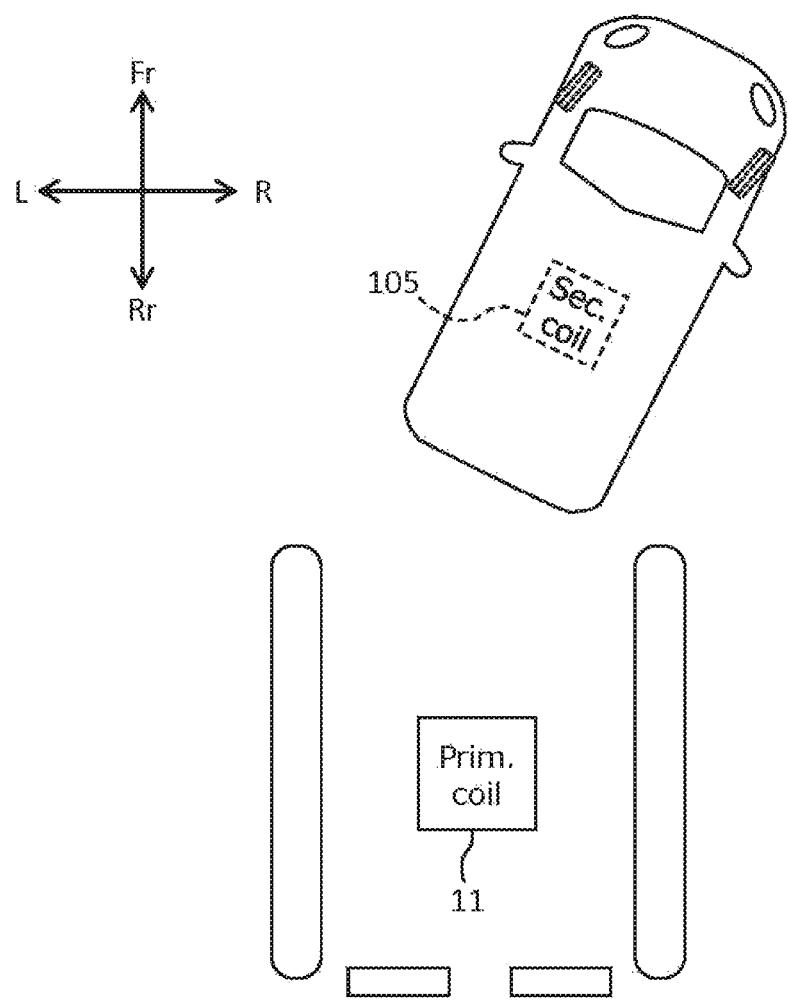
FIG. 2 is a plan view showing a state where the electric vehicle is in the midst of being parked in a parking position where a power transmission apparatus is disposed.
Figure 3:
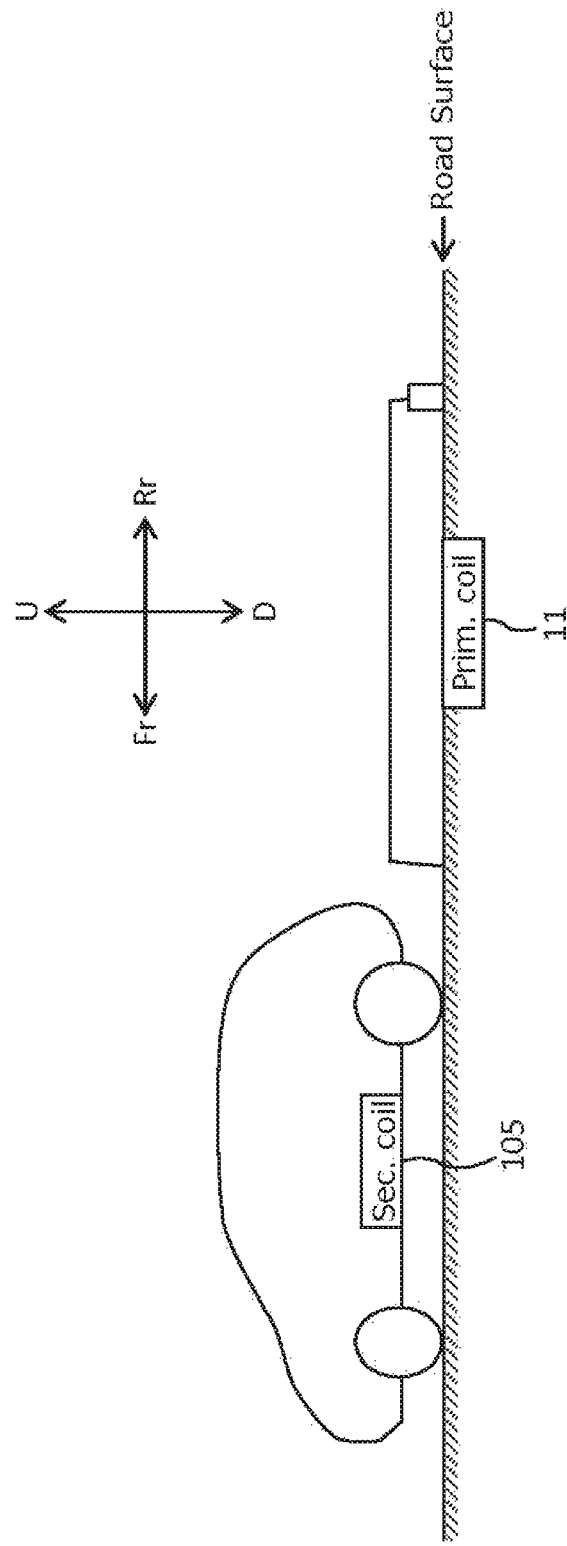
FIG. 3 is a side view showing the state where the electric vehicle is in the midst of being parked in the parking position where the power transmission apparatus is disposed.

The rectifier 103 converts an alternating current voltage which is obtained from an exterior electric power system such as a commercial power supply or the like into a direct current voltage. Electric power which is converted into a direct current voltage by the rectifier 103 is stored in the battery 151. The secondary coil 105 is disposed in a bottom portion of the electric vehicle and receives electric power sent thereto from the exterior electric power system by way of a primary coil, not shown in FIG. 1, by using a non-contact electric power transmission technology. When the primary coil is energized in such a state that the secondary coil 105 faces the primary coil, electric current flows to the secondary coil by the action of electromagnetic induction. The battery 151 of the electric vehicle is charged (through non-contact charging) by way of the rectifier 103 through this electromagnetic induction. The primary coil makes up a power transmission apparatus which is connected to an electric power system such as a commercial power supply or the like. The power transmission apparatus is disposed on a road surface which makes up a parking facility. As shown in FIGS. 2 and 3, the driver of the electric vehicle drives the electric vehicle so as to be reversed towards the power transmission apparatus and stops the electric vehicle when it arrives at a position where the secondary coil 105 of the electric vehicle faces the primary coil 11 of the power transmission apparatus. FIG. 2 is a plan view showing a state where the electric vehicle is in the midst of being parked in a parking position where the power transmission apparatus is disposed. FIG. 3 is a side view showing the state where the electric vehicle is in the midst of being parked in the parking position where the power transmission apparatus is disposed. In moving the electric vehicle towards the power transmission apparatus, the electric vehicle may not only be reversed but also be caused to travel forwards. Namely, this embodiment can also be applied to a case where the electric vehicle is caused to travel forwards towards the power transmission apparatus for head-on parking.

The display unit 107 displays a positional relation between the primary coil 11 of the power transmission apparatus and the secondary coil 105 of the electric vehicle in parking the electric vehicle in the parking position where the power transmission apparatus is disposed. In parking the electric vehicle in the parking position where the power transmission apparatus is disposed, the ECU 109 calculates a relative position of the secondary coil 105 of the electric vehicle relative to the primary coil 11 of the power transmission apparatus and a gradient of the secondary coil 105 relative to the primary coil 11. In addition, the ECU 109 displays information on the relative position and information on the gradient of the secondary coil 105 in a predetermined display mode on the display unit 107 according to the position of the secondary coil 105 relative to the primary coil 11.

The short range wireless unit 111 communicates with the power transmission apparatus in a wireless fashion by the use of a RFID (Radio Frequency Identifier) or the like to acquire information on the position of the primary coil 11. The GPS processing unit 113 receives radio waves from a satellite which utilizes a GPS (Global Positioning System) to acquire the current position of the electric vehicle, that is, information on the position of the secondary coil 105. The information on the positions of the primary and secondary coils is expressed in degrees and minutes of longitude and latitude.

Figure 4:
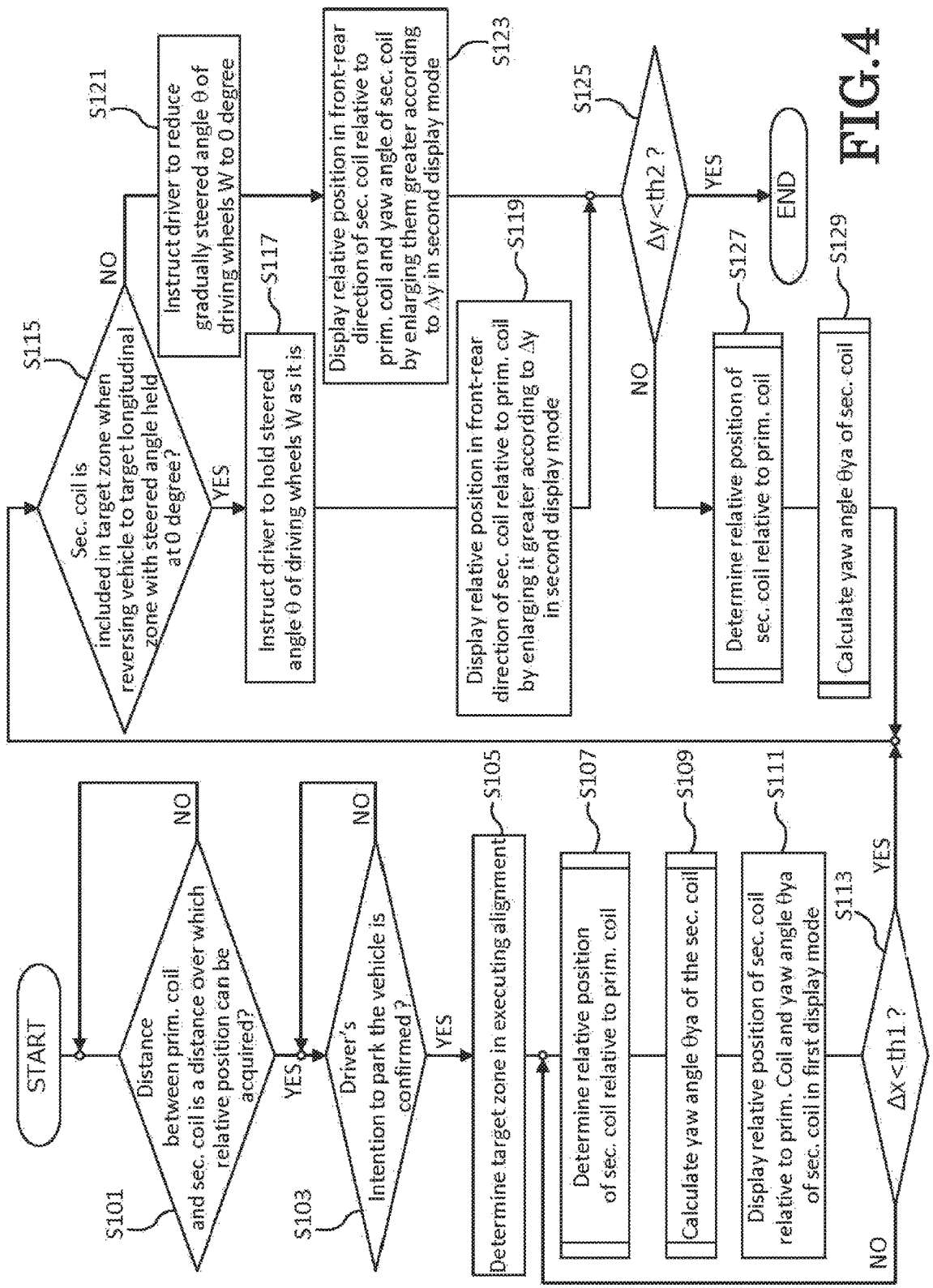
FIG. 4 is a flow chart showing a flow of operations which are executed by an ECU in parking the electric vehicle in the parking position where the power transmission apparatus is disposed.

Next, operations to be executed by the ECU 109 in parking the electric vehicle in the parking position where the power transmission apparatus is disposed will be described by reference to FIG. 4. FIG. 4 is a flow chart showing a flow of operations which are executed by the ECU 109 in parking the electric vehicle in the parking position where the power transmission apparatus is disposed.

As shown in FIG. 4, the ECU 109 determines whether or not a distance between the primary coil of the power transmission apparatus and the secondary coil of the electric vehicle on a plane (a road surface) is a distance over which a relative position of the secondary coil relative to the primary coil can be acquired (step S101). This determination may be made based on whether or not the short range wireless unit 111 of the electric vehicle can communicate with a communication unit of the power transmission apparatus or based on a distance between the position of the power transmission apparatus and the current position of the electric vehicle which is determined by the GPS processing unit 113.

Next, the ECU 109 confirms whether or not the driver of the electric vehicle has an intention to part the electric vehicle (step S103), and if the ECU determines that the driver has the intention to do so, the flow of operations proceeds to step S105. In the confirmation in step S103, the ECU 109 determines that the driver has the intention to part the electric vehicle if a distance between the power transmission apparatus and the vehicle is not longer than a predetermined value. In addition, the ECU 109 may determine that the driver has the intention to park the electric vehicle when a navigation system which is provided on the electric vehicle or a portable information terminal which can communicate with the electric vehicle is operated in a predetermined manner. Alternatively, the ECU 109 may determine that the driver has the intention to park the electric vehicle when the short range wireless unit 111 can communicate with the power transmission apparatus in a wireless fashion. Further, in the case where the electric vehicle is set to be reversed towards the power transmission apparatus for parking, the ECU 109 may determine that the driver "has the intention" with the electric vehicle geared into reverse (R) and may determine that the driver "has no intention" with the electric vehicle geared into other shift positions.

Figure 5:
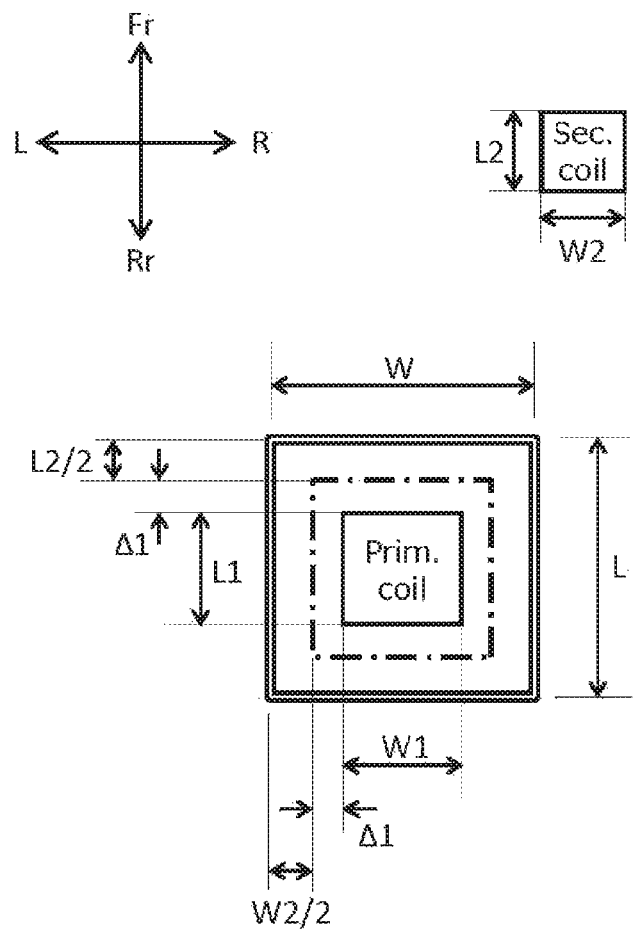
FIG. 5 is a drawing showing a relation in size between a primary coil and a target zone and a relation in size between the target zone and a secondary coil.

In step S105, the ECU 109 determines a target zone on the plane (the road surface) which includes the primary coil for use in aligning the secondary coil of the electric vehicle with the primary coil of the power transmission apparatus. FIG. 5 is a drawing showing a relation in size between the primary coil and the target zone and a relation in size between the target zone and the secondary coil. When the ECU 109 determines the target zone, the short range wireless unit 111 acquires information on the size of the primary coil on the plane (the road surface) where the power transmission apparatus is disposed.

Figure 6A:
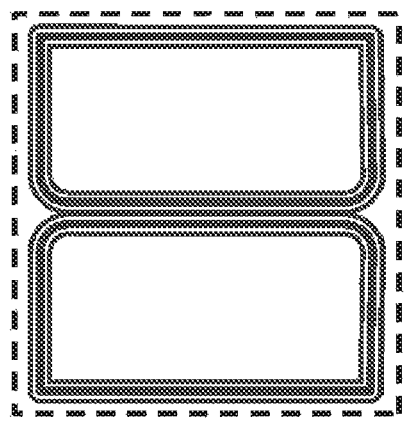
FIGS. 6A to 6C are drawings showing sizes of the primary coil corresponding to shapes thereof.
Figure 6B:
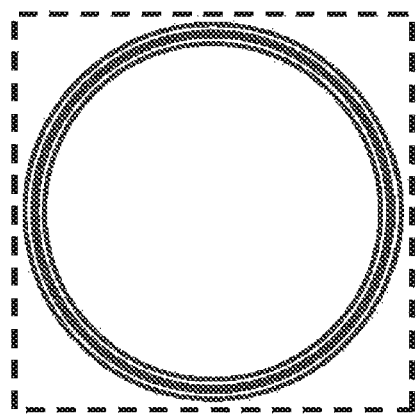
Figure 6C:
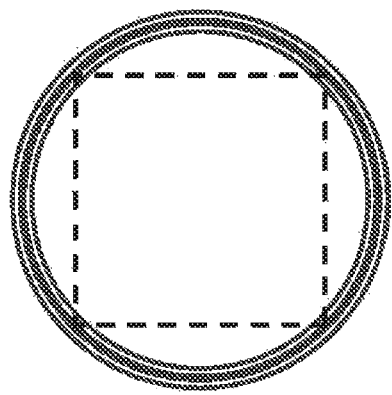

The size of the primary coil is expressed by lengths of two sides of a rectangle which corresponds to the shape of the primary coil. For example, as shown in FIG. 6A, the size of a primary coil made up of two D-shaped coils which are aligned so as to face each other is expressed by lengths of two sides of a rectangle indicated by dotted lines in FIG. 6A which surrounds or contacts the two coils. In addition, as shown in FIG. 6B, the size of a primary coil which has a circular shape is expressed by lengths of two sides of a rectangle indicated by dotted lines in FIG. 6B which surrounds or contacts an outer circumference of the coil. Additionally, as shown in FIG. 6C, the size of a primary coil which has a circular shape is expressed by lengths of two sides of a rectangle indicated by dotted lines in FIG. 6C which is surrounded by or contacts an inner circumference of the coil. As with the primary coil, the size of the secondary coil is expressed by lengths of two sides of a rectangle which corresponds to the shape of the secondary coil. To facilitate the understanding, in FIGS. 6A to 6C, although a slight gap is provided between the actual shape of the primary coil and the dotted rectangle indicating the size of the primary coil, it should be noted that the ECU 109 recognizes that no gap is provided therebetween.

When the short range wireless unit 111 acquires a length L1 in the front-rear or longitudinal direction and a width W1 in the left-right or lateral direction shown in FIG. 5 as information on the size of the primary coil, the ECU 109 adds a positional deviation permitting amount $\Delta 1$ to each end of a longitudinal side (the length L1) and a lateral width (the width W1) of the primary coil. When referred to herein, the "positional deviation permitting amount $\Delta 1$" denotes a length which ensures a sufficient non-contact charging from the view points of the power transmission efficiency and the strength of leakage magnetic field in the event that a center coordinate of the secondary coil is situated not farther than the positional deviation permitting amount $\Delta 1$ from the primary coil, although the center coordinate of the secondary coil is not situated on the primary coil. Further, a zone defined by a longitudinal length resulting from adding a length equal to a half value of a length L2 of the secondary coil to each longitudinal end of the primary coil and a lateral width resulting from adding a width equal to a half value of a width W2 of the secondary coil to each lateral end of the primary coil is determined as a target zone. The positional deviation permitting amount $\Delta 1$ may be a fixed value or a variable value which varies according to the state of charge of the battery 151 of the electric vehicle. For example, in the case of the positional deviation permitting amount $\Delta 1$ being a variable value which varies according to the SOC (State of Charge) of the battery 151, the ECU 109 may set the positional deviation permitting amount $\Delta 1$ so as to become smaller as the SOC value becomes smaller and to become greater as the SOC value becomes greater. In addition, the positional deviation permitting amount $\Delta 1$ which is added to the ends of the four, longitudinal and lateral, sides of the primary coil may differ for each side.

In the size of the target zone determined in the way described above and shown as being surrounded by double lines in FIG. 5, a longitudinal length L is expressed by equation (1) below, and a lateral width W is expressed by equation (2) below.

$$L = L1 + 2 \times \Delta 1 + 2 \times (L2/2) \tag{1}$$

$$W = W1 + 2 \times \Delta 1 + 2 \times (W2/2) \tag{2}$$

Next, the ECU 109 determines a relative position of the secondary coil on the plane (the road surface) relative to the primary coil by using either of two methods, which will be described later (step S107). The two methods are a method using a coupling coefficient of the primary coil and the secondary coil and a method using a short range wireless communication.

Figures 7A, 7B:
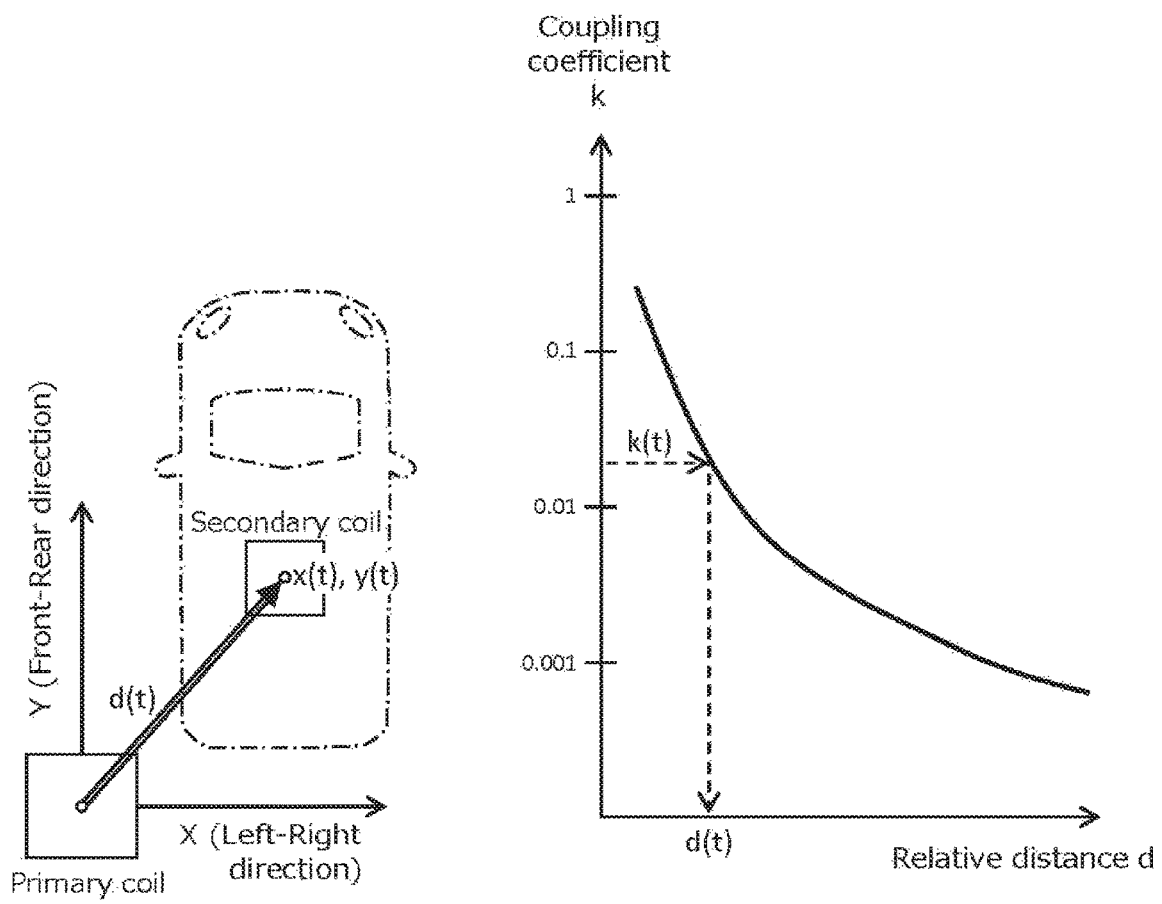
FIG. 7A is a drawing showing an example of a relative position of the secondary coil relative to the primary coil.
FIG. 7B is a drawing showing a relation in coupling coefficient and relative distance between the primary coil and the secondary coil.
Figure 8:
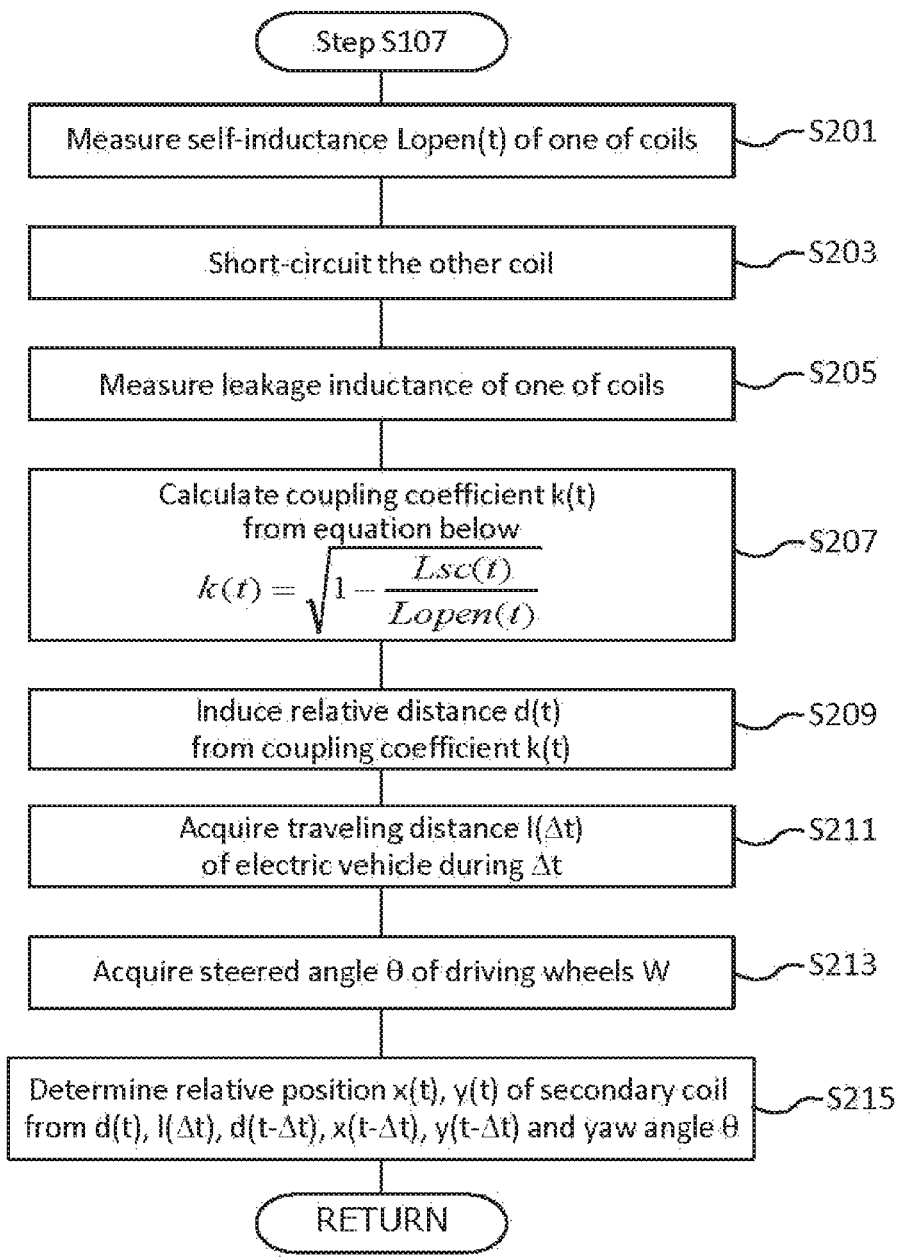
FIG. 8 is a flow chart showing a flow of operations which are executed by the ECU in determining a relative position between the primary coil and the secondary coil by using a method which utilizes a coupling coefficient thereof.

Firstly, a case will be described where a relative position of the secondary coil relative to the primary coil is determined by using the method using the coupling coefficient of the primary coil and the secondary coil. FIG. 7A is a drawing showing an example of a relative position of the secondary coil relative to the primary coil. FIG. 7B is a drawing showing a relation between the coupling coefficient and the relative position between the primary coil and the secondary coil. FIG. 8 is a flow chart showing a flow of operations which are executed by the ECU 109 in determining a relative position between the primary coil and the secondary coil by using the method which utilizes the coupling coefficient thereof.

When a coupling coefficient k between the primary coil and the secondary coil is acquired, a relative distance d between the primary coil and the secondary coil can be induced from a relation map between coupling coefficient k and relative distance d shown in FIG. 7B or an enumeration expression. Consequently, as shown in FIG. 8, the ECU 109 calculates at first a coupling coefficient k. The ECU 109 measures a self inductance Lopen(t) of one of the coils (for example, the secondary coil) at a time t (step S201). Next, the ECU 109 short-circuits the other coil (for example, the primary coil) (step S203) and measures a leakage inductance Lsc(t) of the coil (the secondary coil) at the time t with the other coil (the primary coil) kept short-circuited (step S205). Next, the ECU 109 calculates a coupling coefficient k between the primary coil and the secondary coil at the time t from equation (3) below (step S207).

$$k(t) = \sqrt{1 - \frac{Lsc(t)}{Lopen(t)}} \quad (3)$$

Next, the ECU 109 induces a relative distance d(t) between the primary coil and the secondary coil from the relation map shown in FIG. 7B or an enumeration expression (step S209). Next, the ECU 109 acquires a distance l(Δt) over which the electric vehicle travels from a time t−Δt to the time t (step S211). The traveling distance l(Δt) is obtained from, for example, a rotational angle of the driving wheels W during a time difference Δt. Next, the ECU 109 acquires a steered angle θ of the driving wheels W (step S213). The steered angle θ is acquired from an operation or turning amount of the steering wheel S.

Next, the ECU 109 determines a relative position {x(t), y(t)} of the secondary coil at the time t based on the relative distance d(t) induced in step S209, the traveling distance l(Δt) acquired in step S211, the relative distance d(t−Δt) at the time t−Δt, the position {x(t−Δt), y(t−Δt)} of the secondary position at the time t−Δt which was acquired in the previous flow and the steered angle θ acquired in step S213. A relative distance d(0) and a position {x(0), y(0)} of the secondary coil when the ECU 109 initiates a sub-routine shown in FIG. 8 (t=Δt, t−Δt=0) to determine a relative position of the secondary coil are acquired from information on the position of the primary coil acquired by the short range wireless unit 111 and information on the position of the secondary coil acquired by the GPS processing unit 113.

Figure 9:
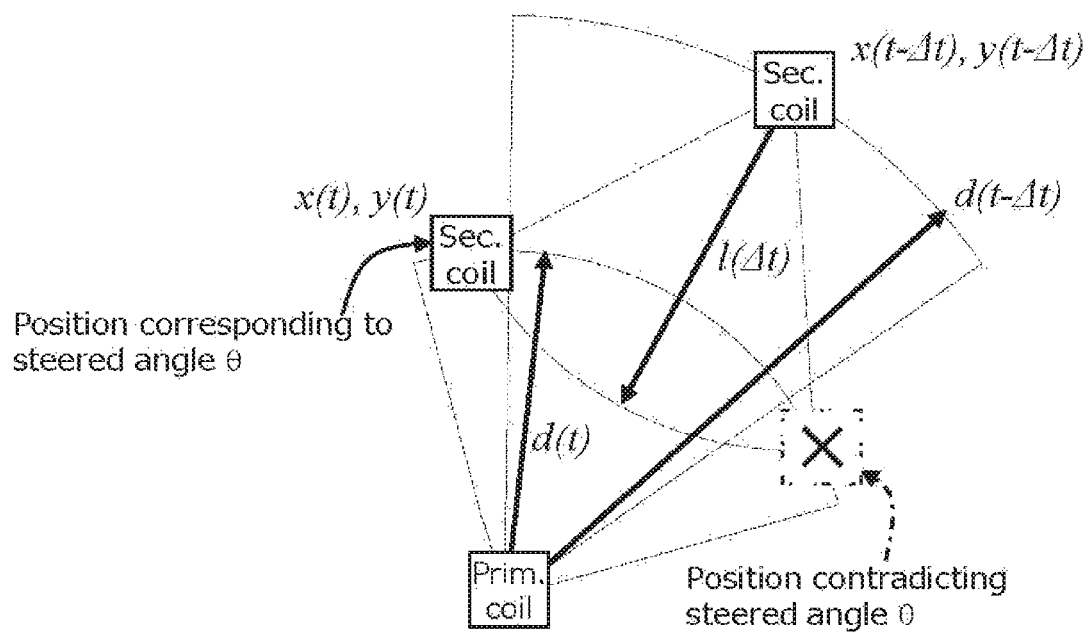
FIG. 9 is a drawing showing relations among a distance $d(t-\Delta t)$ and a relative position $\{x(t-\Delta t), y(t-\Delta t)\}$ between the primary coil and the secondary coil at a time $t-\Delta t$, a traveling distance $l(\Delta t)$ during a time $\Delta t$, a relative distance $d(t)$ of the secondary coil at a time t, a relative position $\{x(t), y(t)\}$ of the secondary coil which corresponds to a steered angle $\theta$ at the time t, and a relative position of the secondary coil which contradicts the steered angle $\theta$ at the time t.

FIG. 9 is a drawing showing relations among the distance d(t−Δt) and the relative position {x(t−Δt), y(t−Δt)} between the primary coil and the secondary coil at the time t−Δt, the traveling distance l(Δt) during the time Δt, the relative distance d(t) of the secondary coil at the time t, the relative position {x(t), y(t)} of the secondary coil which corresponds to the steered angle θ at the time t, and the relative position of the secondary coil which contradicts the steered angle θ at the time t. As shown in FIG. 9, of points of intersection between an arc which is centered at the relative position {x(t−Δt), y(t−Δt)} of the secondary coil relative to the primary coil at the time t−Δt and which takes the traveling distance i(Δt) as a radius thereof and an arc which is centered at the primary coil and which takes the relative distance d(t) of the secondary coil as a radius thereof, the ECU 109 determines a point of intersection which corresponds to the steered angle θ as the relative position {x(t), y(t)} of the secondary coil at the time t. In the event that the steered angle θ is 0 degree, the number of points of intersection between the two arcs will be one.

The method of determining a relative position which uses the coupling coefficient between the primary coil and the secondary coil is not limited to the method described by reference to FIGS. 8 and 9, and hence, any method may be used as long as the coupling coefficient between the primary coil and the secondary coil and a change with time in the coupling coefficient are used.

Figure 10:
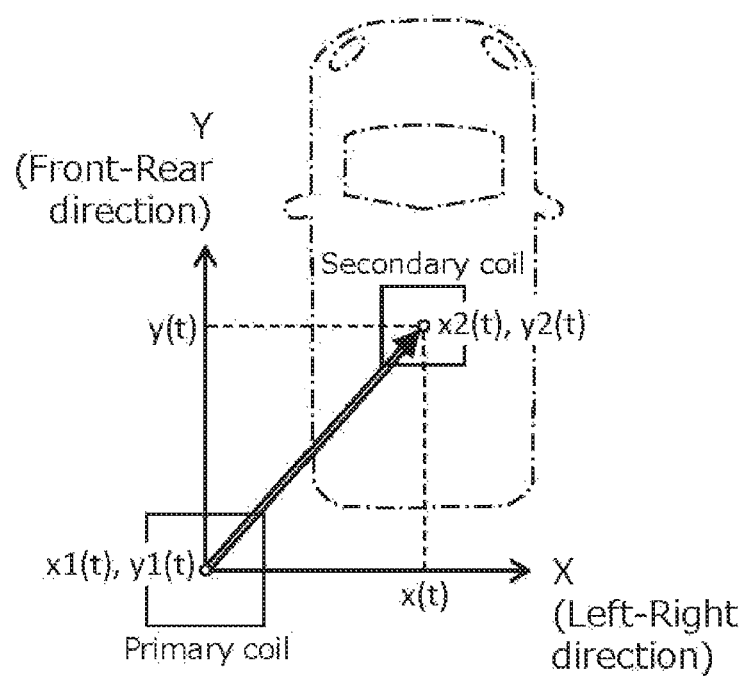
FIG. 10 is a drawing showing an example of a relative position of the secondary coil relative to the primary coil.

Next, a case will be described where a relative position is determined by using the method which utilizes the short range wireless communication. FIG. 10 is a drawing showing an example of a relative position of the secondary coil relative to the primary coil. The ECU 109 determines a relative position {x(t), y(t)} (={x2(t)−x1(t), y2(t)−y1(t)}) of the secondary coil relative to the primary coil based on information on the position {x2(t), y2(t)} of the secondary coil which is acquired by the GPS processing unit 113 and information on the position {x1(t), y1(t)} of the primacy coil which is acquired from the power transmission apparatus by the short range wireless unit 111. As long as the primary coil does not include a moving mechanism, the information on the position {x1(t), y1(t)} of the primacy coil takes a fixed value which is independent of the time t.

Figure 11:
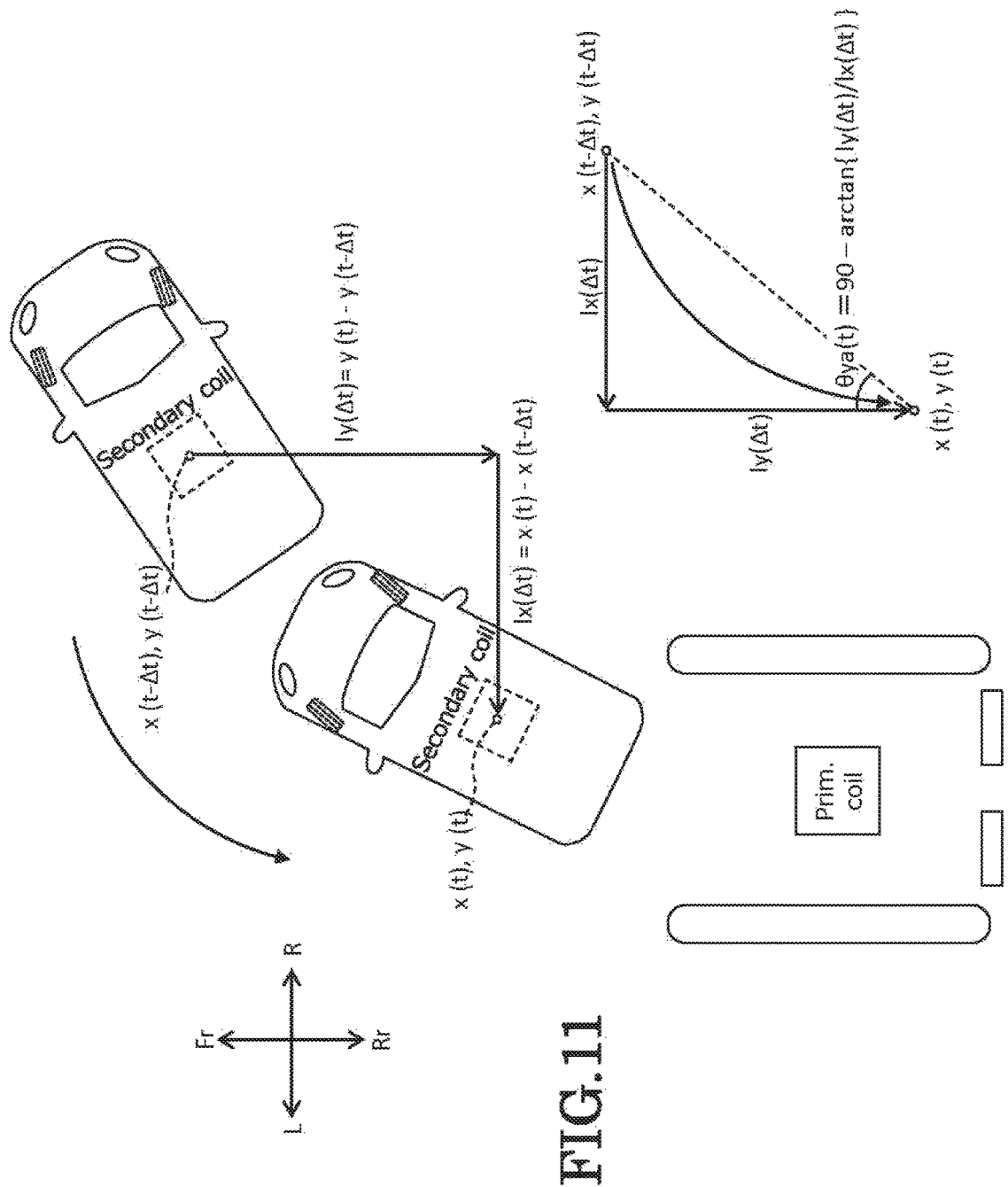
FIG. 11 is a drawing showing a relation between a displacement of the secondary coil and a yaw angle $\theta ya$ of the secondary coil relative to the primary coil.

When the relative position of the secondary coil relative to the primary coil is determined in the way described above, the ECU 109 next calculates a yaw angle (a gradient) of the secondary coil relative to the primary coil (step S109). FIG. 11 is a drawing showing a relation between a displacement of the secondary coil and a yaw angle θya of the secondary coil relative to the primary coil. The ECU 109 calculates a traveling distance ly(Δt) in the front-rear direction of the secondary coil during a time Δt and a traveling distance lx(Δt) in the left-right direction of the secondary coil during the time Δt based on the relative position {x(t−Δt), y(t−Δt)} of the secondary coil relative to the primary coil at the time t−Δt and the relative position {x(t), y(t)} of the secondary coil relative to the primary coil at the time t and then calculates a yaw angle θya(t) of the secondary coil relative to the primary coil at the time t from equation (4) shown below.

$$\theta ya(t)=90-\arctan\{ly(\Delta t)/lx(\Delta t)\} \quad (4)$$

Figure 12:
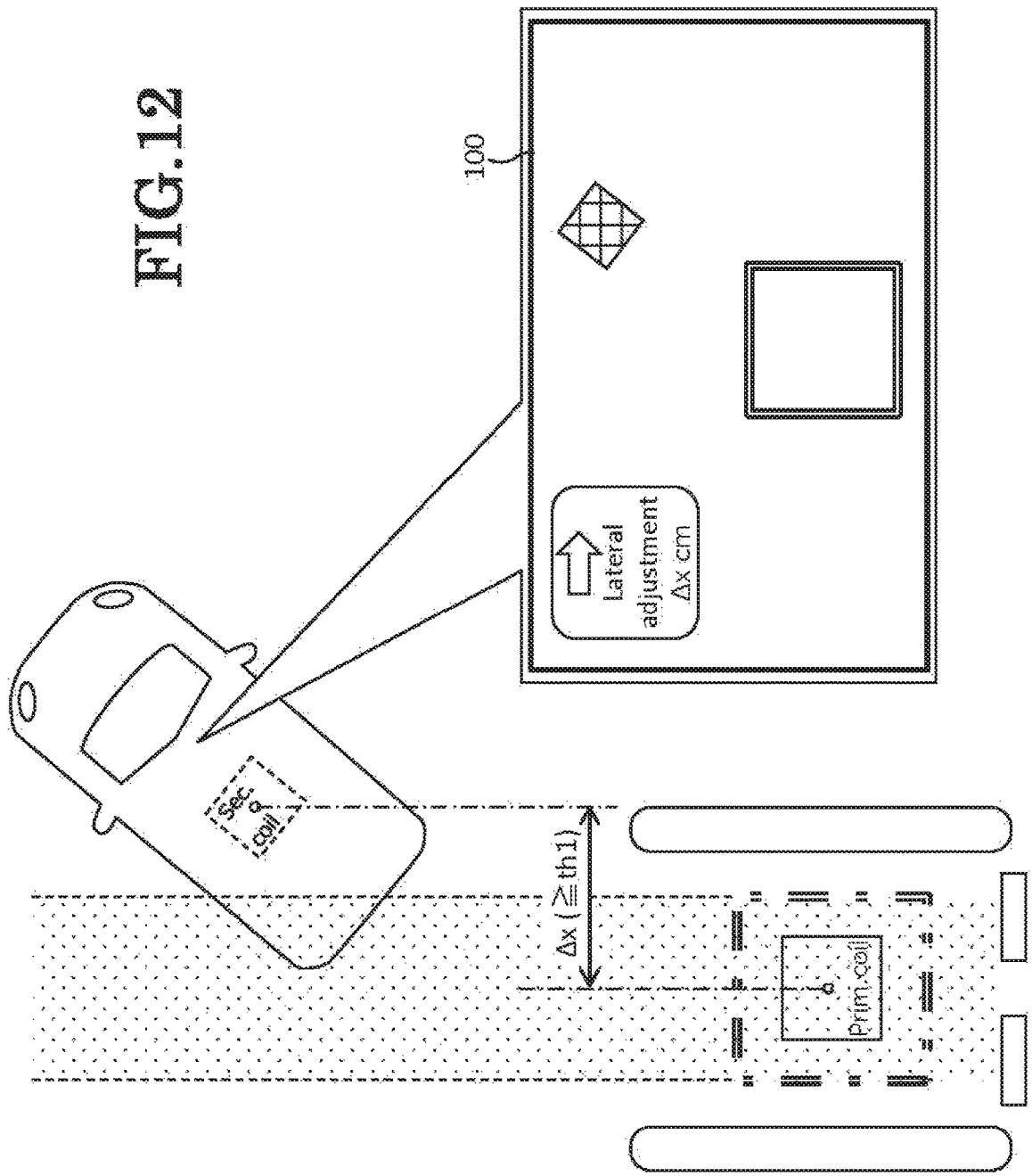
FIG. 12 is a drawing showing an example of a state taking place when a deviation $\Delta x$ in a left-right direction or a lateral deviation $\Delta x$ is not smaller than a first threshold th1 ($\Delta x \geq th1$) and an example of information to be displayed on a screen of a display unit when the lateral deviation $\Delta x$ is not smaller than the first threshold th1.

Next, the ECU 109 calculates a deviation of the secondary coil in the left-right direction (hereinafter, referred to as a "lateral deviation") Δx on the plane (the road surface) where the power transmission apparatus is disposed based on the relative position of the secondary coil relative to the primary coil which is determined in step S107 and then processes the relative position of the secondary coil and the yaw angle of the secondary coil relative to the target zone in a way displayed in a first display mode on the display unit 107 (step S111). FIG. 12 is a drawing showing an example of a state which takes place when the lateral deviation Δx is not smaller than a first threshold th1 (Δx≥th1) and an example of information to be displayed on a screen of the display unit 107 when the lateral deviation Δx is not smaller than the first threshold th1. In the example shown in FIG. 12, the target zone is shown as a rectangle defined by double lines, and the secondary coil is shown as a hatched rectangle.

As shown in FIG. 12, the target zone, the relative positions of the secondary coil in the front-rear direction and the left-right direction and the yaw angle of the secondary coil relative to the target zone, as well as the lateral deviation Δx in the left-right direction of the secondary coil relative to the primary coil are displayed on the display unit 107 which displays these pieces of information in the first display mode. The magnitude of the lateral deviation Δx in the left-right direction of the secondary coil relative to the primary coil is indicated by a numeric value and the direction thereof is indicated by an arrow. In the first display mode, the deviation in the front-rear direction of the secondary coil relative to the primary coil (hereinafter, referred to as the "longitudinal deviation") Δy is not displayed.

Figure 13A:
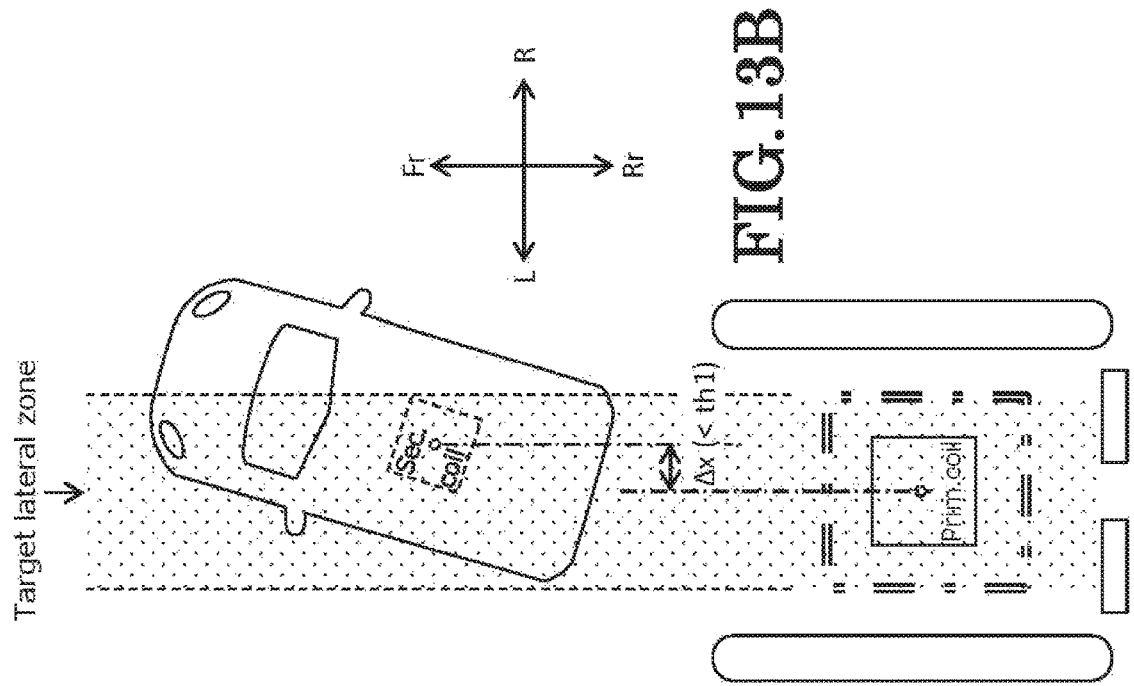
FIG. 13A is a drawing showing an example of a state taking place when the lateral deviation $\Delta x$ is not smaller than the first threshold th1 ($\Delta x \geq th1$)
Figure 13B:
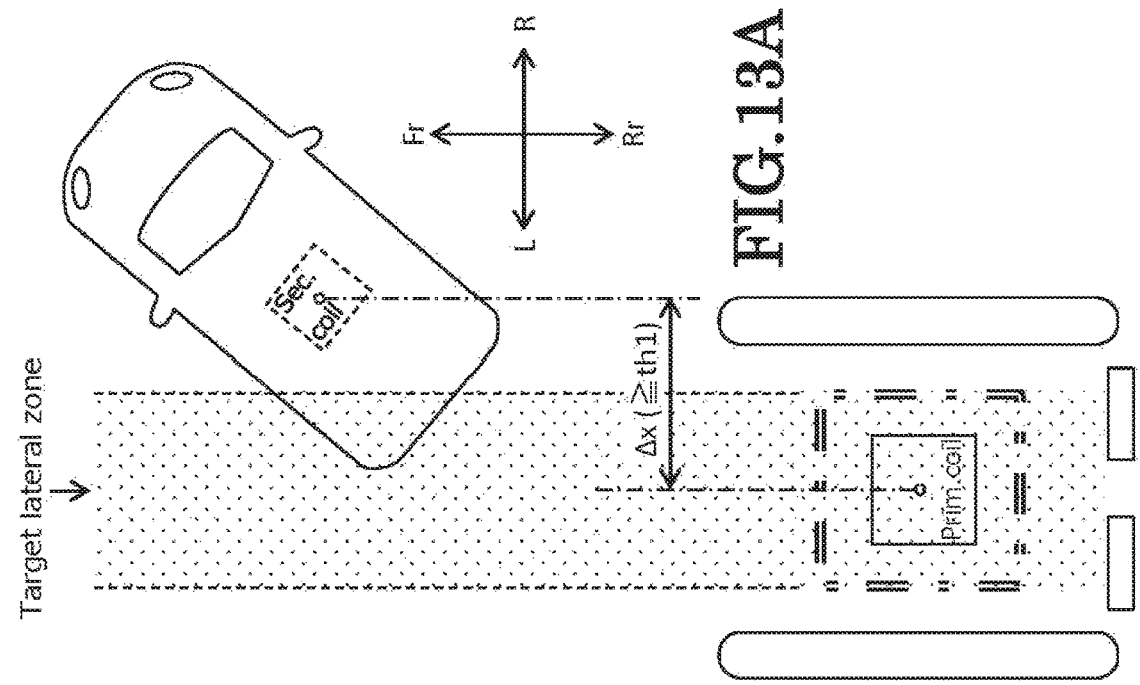
FIG. 13B shows an example of a state taking place when the lateral deviation $\Delta x$ is smaller than the first threshold th1 ($\Delta x < th1$).

Next, the ECU 109 determines whether or not the lateral deviation Δx is smaller than the first threshold th1 (Δx<th1) (step S113). The lateral deviation Δx is a distance between centers of the primary coil and the secondary coil in the left-right direction. In FIG. 13, FIG. 13A is a drawing showing an example of a state taking place when the lateral deviation Δx is not smaller than the first threshold th1 (Δx≥th1), and FIG. 13B shows an example of a state taking place when the lateral deviation Δx is smaller than the first threshold th1 (Δx<th1). When the lateral deviation Δx is not smaller than the first threshold th1 (Δx≥th1), as shown in FIG. 13A, the secondary coil is not included in a zone resulting from expanding the target zone indicated by double alternate long and short dash lines in the front-rear direction (hereinafter, referred to as a "target lateral zone"). On the other hand, when the lateral deviation Δx is smaller than the first threshold th1 (Δx<th1), as shown in FIG. 13B, the secondary coil is included in the target lateral zone. The first threshold th1 is set in advance at a value of the lateral deviation Δx resulting when one of side edges of the secondary coil in the left-right direction overlaps a side edge of the target lateral zone. Namely, the first threshold th1 takes the same value as "W1/2+Δ1" in FIG. 5.

If the result of the determination made in step S113 is "Δ1<th1" (step S113: YES), an alignment in the front-rear direction constitutes a critical aspect, and the flow proceeds to step S115. On the other hand, if the result of the determination made in step S111 is "Δ1≥th1" (step S111: NO), an alignment in the left-right direction constitutes a critical aspect, and the flow proceeds to step S113. As another embodiment, the operation in step S113 may be executed before the operation in step S111 is executed. As this occurs, if the result of the determination made in step S113 is "Δ1<th1," the flow proceeds to step S115, whereas if the result is "Δ1≥th1," the flow proceeds to step S111.

In step S115, when the electric vehicle is reversed with the steered angle θ held at 0 degree to arrive at a position where the secondary coil is included in a zone resulting from expanding the target zone in the left-right direction (hereinafter, referred to as a "target longitudinal zone"), the ECU 109 assumes whether or no the secondary coil is included in the target zone based on the relative position {x(t), y(t)} of the secondary coil relative to the primary coil which is determined in step S107 and the yaw angle θya of the secondary coil which is calculated in step S109. If it is determined from the result of the assumption made in step S115 that the secondary coil is included in the target zone, the flow proceeds to step S117, whereas if it is determined that the secondary coil is not included in the target zone, the flow proceeds to step S121.

Figure 14:
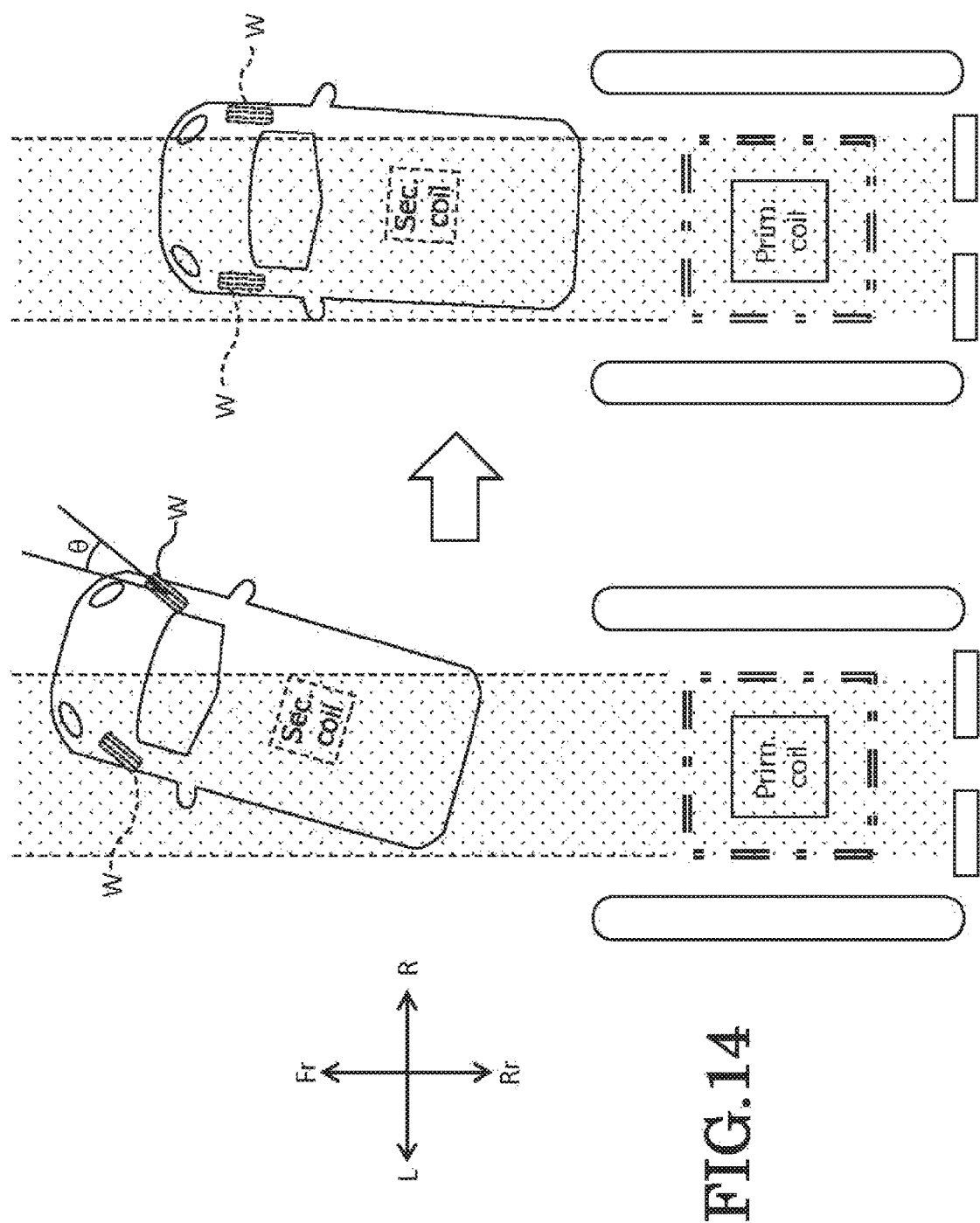
FIG. 14 is a drawing showing a state of the electric vehicle before a driver turns driving wheels W so that a steered angle $\theta$ becomes 0 degree and after the driver turns the driving wheels W so that the steered angle $\theta$ becomes 0 degree.

In step S117, the ECU 109 instructs the driver to hold the steered angle θ of the driving wheels W as it is without turning the steering wheel S of the electric vehicle. On the other hand, in step S121, the ECU 109 instructs the driver to reduce gradually the steered angle θ of the driving wheels W to 0 degree by turning the steering wheel S of the electric vehicle. These instructions may be displayed on the display unit 107 or may be given in the form of voice. FIG. 14 shows a state of the electric vehicle resulting before the driver reduces gradually the steered angle θ towards 0 degree and a state of the electric vehicle where the steered angle θ is reduced to become 0 degree.

Figure 15:
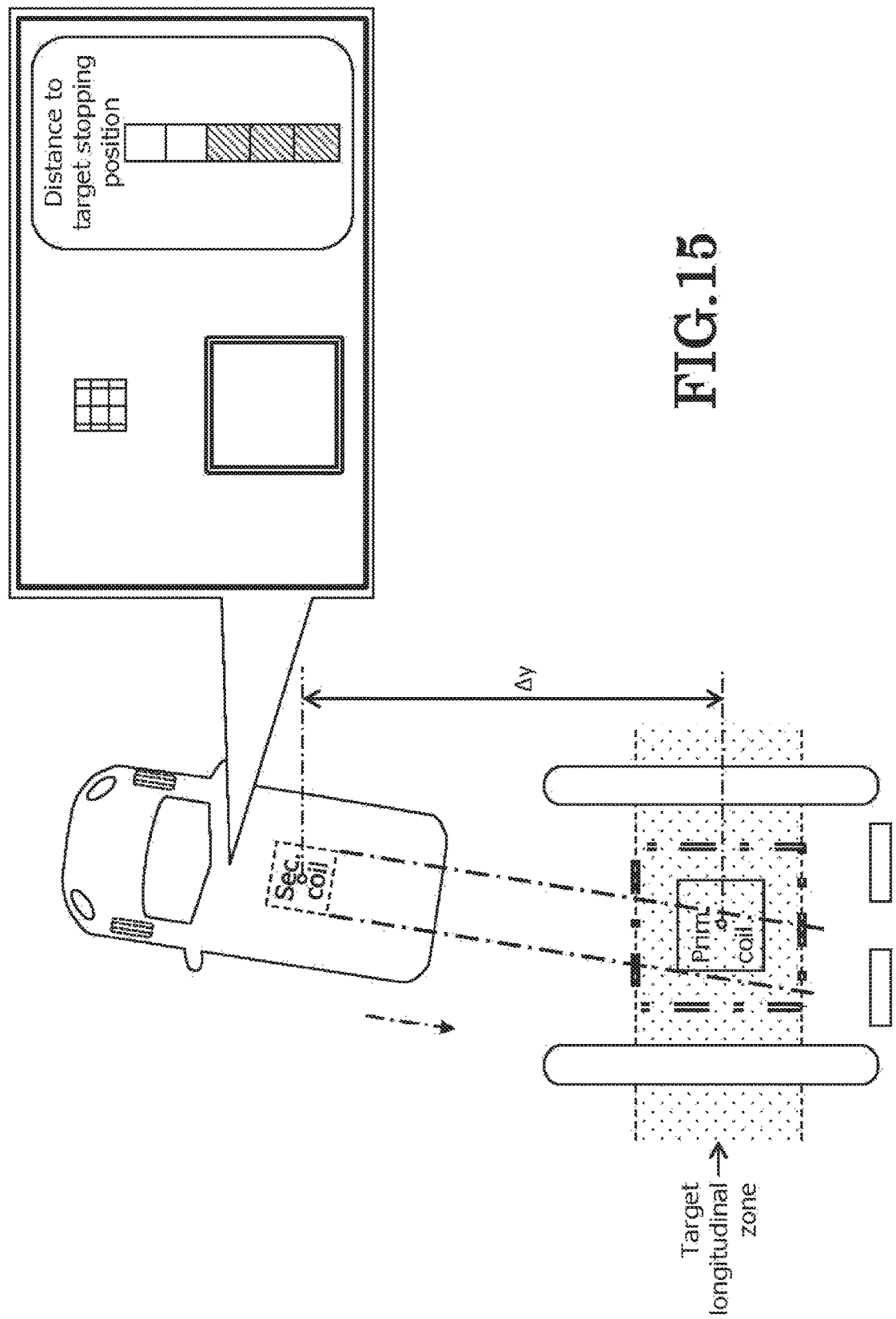
FIG. 15 is a drawing showing an example of a state when the lateral deviation Δx is smaller than the first threshold th1 (Δx<th1) and an example of information to be displayed when the lateral deviation Δx is smaller than the first threshold th1.

After having completed the operation in step S117, the ECU 109 displays the longitudinal relative position of the secondary coil relative to the target zone and the like in the second display mode on the display unit 107 (step S119). FIG. 15 is a drawing showing an example of a state taking place when the lateral deviation Δx is smaller than the first threshold th1 (Δx<th1) where the electric vehicle is reversed with the steered angle of the driving wheels W kept at 0 degree and the secondary coil enters the target zone and an example of a screen of the display unit 107 which is displayed then. In the example shown in FIG. 15, the target zone is shown as a rectangle defined by double lines, and the secondary coil is shown as a hatched rectangle.

When activated to display information in step S119, as shown in FIG. 15, the display unit 107 displays the target zone, the relative position in the front-rear direction of the secondary coil relative to the target zone and an index which varies according to the longitudinal deviation Δy. The longitudinal deviation Δy is a distance between the centers of the primary coil and the secondary coil in the front-rear direction. It is preferable that the relative position in the left-right direction of the secondary coil relative to the target zone and the lateral deviation Δx are not displayed in the second display mode. Namely, even though there exists a deviation in the left-right direction between the target zone and the secondary coil, the target zone and the secondary coil are displayed on the display unit 107 as being aligned with each other in the center thereof.

In addition, the secondary coil displayed on the display unit 107 in step S119 is expressed by a yaw angle of almost 0 degree as shown in FIG. 15. However, the yaw angle is not limited to almost 0 degree, and hence, the secondary coil may be expressed by a yaw angle which has a value smaller than the yaw angle θya calculated in step S109.

Figure 16:
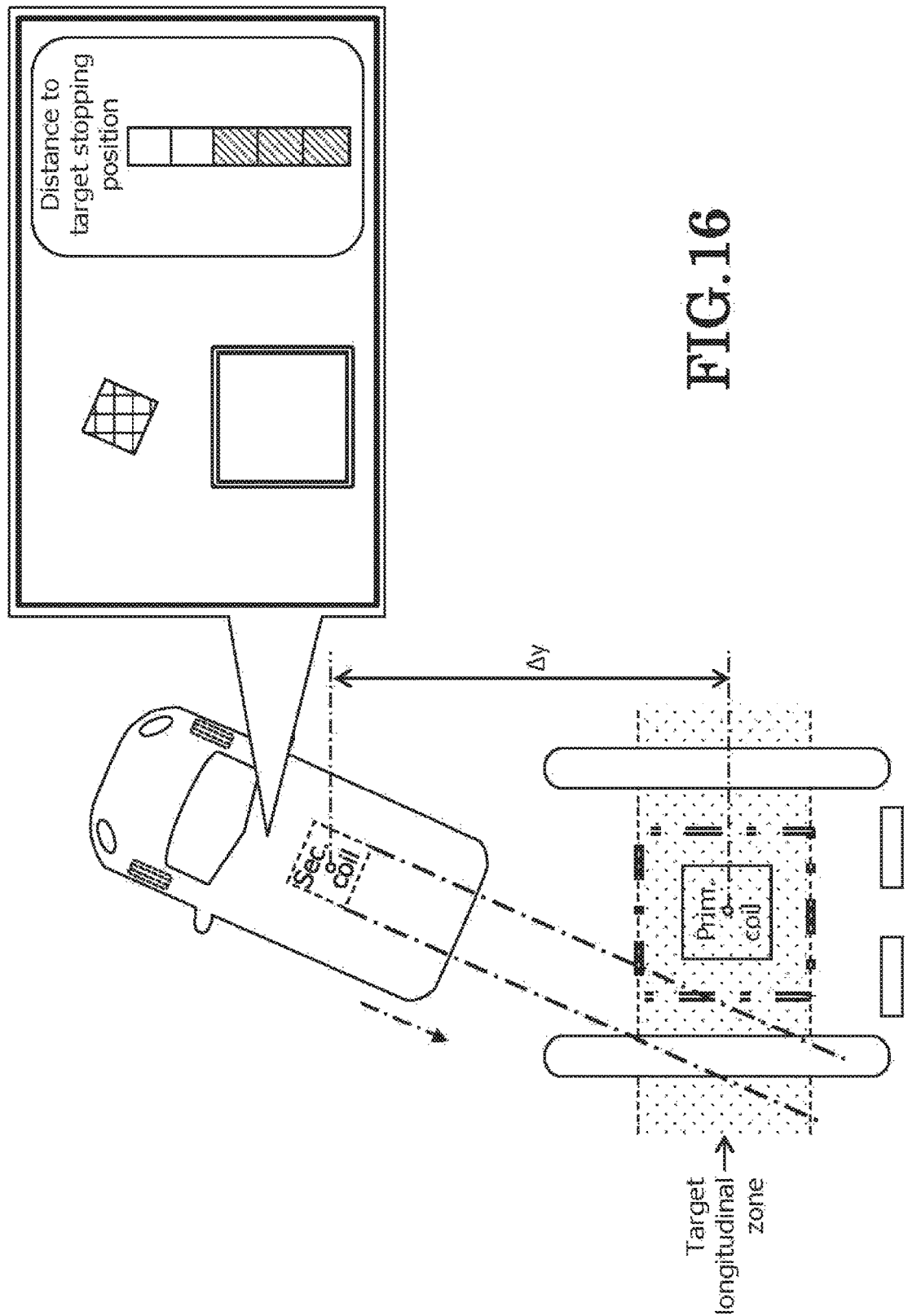
FIG. 16 is a drawing showing an example of a state when the lateral deviation Δx is smaller than the first threshold th1 (Δx<th1) and an example of information to be displayed when the lateral deviation Δx is smaller than the first threshold th1.

On the other hand, after having completed the operation in step S121, the ECU 109 displays the longitudinal relative position of the secondary coil relative to the target zone, the yaw angle of the secondary coil and the like in the second display mode on the display unit 107 (step S123). FIG. 16 is a drawing showing an example of a state taking place when the lateral deviation Δx is smaller than the first threshold th1 (Δx<th1) where the electric vehicle is reversed with the steered angle of the driving wheels W kept at 0 degree and the secondary coil does not enter the target zone and an example of a screen of the display unit 107 which is displayed then. In the example shown in FIG. 16, the target zone is shown as a rectangle defined by double lines, and the secondary coil is shown as a hatched rectangle.

When activated to display information in step S123, as shown in FIG. 16, the display unit 107 displays the target zone, the relative position in the front-rear direction of the secondary coil relative to the target zone and the yaw angle of the secondary coil, as well as the index which varies according to the longitudinal deviation Δy. In this case, too, it is preferable that the relative position in the left-right direction of the secondary coil relative to the target zone and the lateral deviation Δx are not displayed. Namely, even though there exists a deviation in the left-right direction between the target zone and the secondary coil, the target zone and the secondary coil are displayed on the display unit 107 as being aligned with each other in the center thereof. In addition, the secondary coil displayed on the display unit 107 in step S123 is expressed by the yaw angle calculated in step S109, as shown in FIG. 16.

Figure 17:
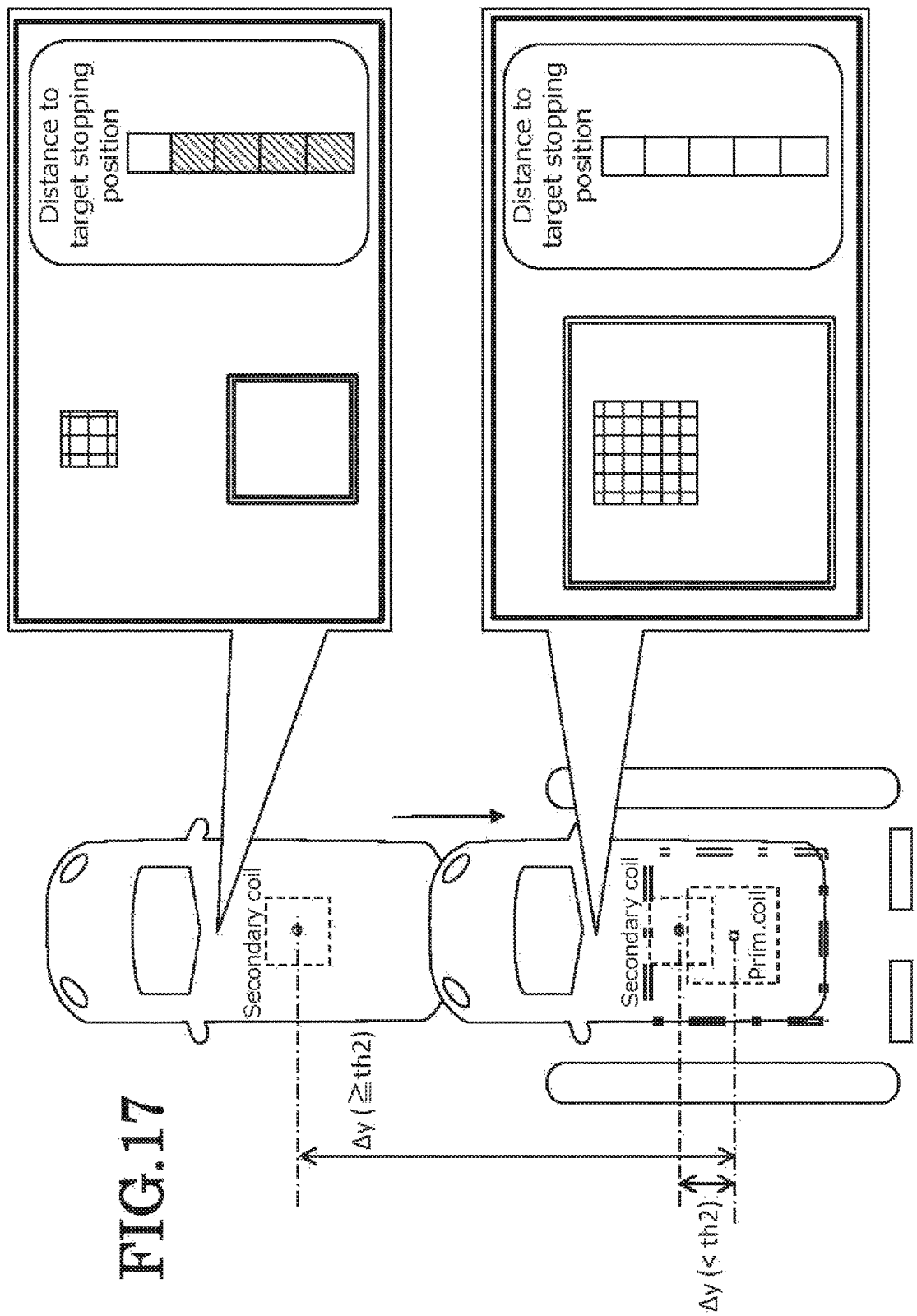
FIG. 17 is a drawing showing an example of a state taking place when the lateral deviation Δx is smaller than the first threshold th1 (Δx<th1) where the electric vehicle is reversed and the secondary coil enters a target zone and examples of information to be displayed when the electric vehicle is reversed and the secondary coil enters the target zone.

In the second display mode of the display unit 107 in step S119 or step S123, as shown in FIG. 17, figures which indicate the target zone and the secondary coil are displayed as being enlarged more as the longitudinal deviation Δy becomes smaller.

After having completed the operation in step S119 or step S123, the ECU 109 determines whether or not the longitudinal deviation Δy is smaller than a second threshold th2 (Δy<th2) (step S125), and if "Δy<th2," the series of operations is ended, whereas if "Δy≥th2," the flow proceeds to step S127. The second threshold th2 is set in advance at a value of the longitudinal deviation Δy resulting when one of side edges of the secondary coil in the front-rear direction overlaps a side edge of the target longitudinal zone. Namely, the second threshold th2 takes the same value as "L1/2+Δ1" in FIG. 5.

In step S127, the ECU 109 determines a relative position of the secondary coil on the plane (the road surface) relative to the primary coil by using either of the two methods described above. An operation in step S127 is the same as the operation in step S107. Next, the ECU 109 calculates a yaw angle (a gradient) of the secondary coil relative to the primary coil (step S129). An operation in step S129 is the same as the operation in step S109. After the ECU 109 has completed the operation in step S129, the flow proceeds to step S115.

FIG. 18 is a chart showing information in relation to the left-right direction, information in relation to the front-rear direction, information on the yaw angle of the secondary coil and how to execute an enlarged display for each of the first display mode which is displayed in step S111 and the second display mode which is displayed in step S119 or step S123. As shown in FIG. 18, in the first display mode in which the alignment in the left-right direction is critical, the relative positions in the front-rear direction and the left-right direction of the secondary coil relative to the target zone and the lateral deviation Δx are displayed, and the secondary coil is displayed as reflecting the yaw angle. In the first display mode, the longitudinal deviation Δy is not displayed. On the other hand, in the second display mode in which the alignment in the front-rear direction is critical, the relative position in the front-rear direction relative to the target zone and the index which varies according to the longitudinal deviation Δy are displayed. It is preferable that the relative position in the left-right direction of the secondary coil relative to the target zone and the lateral deviation Δx are not displayed in the second display mode.

FIG. 19 shows other display examples which are displayed on the display unit 107 in the second display mode when the electric vehicle is reversed. In a display example 1 shown in FIG. 19, the secondary coil is shown by a figure copying a vehicle and the target zone is shown by a hatched rectangle. In a display example 2 shown in FIG. 19, the secondary coil is shown by a triangle defined by double lines, and the target zone is shown by a hatched triangle. In the display example 2, when the longitudinal deviation Δy becomes smaller than the second threshold th2 (Δy<th2), the two triangles are displayed as being superposed on each other accurately. In a display example 3 shown in FIG. 19, an index is displayed which varies according to the longitudinal deviation Δy. In the display example 3, when the longitudinal deviation Δy becomes smaller than the second threshold th2 (Δy<th2), the index is displayed no more.

Thus, as has been described heretofore, since the relative position of the secondary coil and the yaw angle of the secondary coil relative to the primary coil are displayed on the display unit 107 when the secondary coil of the electric vehicle is aligned with the primary coil of the power transmission apparatus, the driver of the electric vehicle can grasp accurately the state of the secondary coil relative to the primary coil by watching the screen of the display unit 107. Specifically, the relative position of the secondary coil and the yaw angle of the secondary coil relative to the primary coil are displayed on the display unit in the different display modes for the case where the secondary coil is not included in the target lateral zone (Δx≥th1) which constitutes the critical aspect in the alignment in the left-right direction and the case where the secondary coil is included in the target lateral zone (Δx<th1) which constitutes the critical aspect in the alignment in the front-rear direction. In the event that the secondary coil is not included in the target lateral zone (Δx≥th1), the relative position of the secondary coil and the yaw angle of the secondary coil relative to the primary coil are displayed on the display unit. In addition, in the event that the secondary coil is included in the target lateral zone, which constitutes the critical aspect in the alignment in the front-rear direction (Δx<th1), the relative position is displayed on the display unit as being enlarged greater as the secondary coil approaches the primary coil in relation to the front-rear direction. Consequently, the positional alignment with appropriate accuracy can be executed easily by the driver operating the electric vehicle while watching the screen of the display unit. Further, in the event that a device for measuring a coupling coefficient between the primary coil and the secondary coil or a device for acquiring pieces of information on the positions of the primary coil and the secondary coil is provided in addition to the display unit, the embodiment can be realized. Thus, the support for the positional alignment is executed at low cost.

In the aspect (the first display mode) where the alignment in the left-right direction is critical, the information in relation to the left-right direction is displayed more than the information in relation to the front-rear direction as the relative position. As this occurs, by referring to or watching the screen of the first display mode displayed on the display unit, the driver of the electric vehicle can easily execute the alignment in the left-right direction with appropriate accuracy. On the other hand, in the aspect where the alignment in the front-rear direction is critical (the second display mode), the information in relation to the front-rear direction is displayed more than the information in relation to the left-right direction as the relative position. As this occurs, by referring to or watching the screen of the second display mode displayed on the display unit, the driver of the electric vehicle can easily execute the alignment in the front-rear direction with appropriate accuracy. In addition, since the information in relation to the front-rear direction is more than the information in relation to the left-right direction as the relative position which is displayed on the display unit, it is considered that the driver tends to concentrate on the longitudinal alignment and hence does nothing about the lateral operation. As a result, it is possible to restrain the driver of the electric vehicle from changing the relative position in the left-right direction.

In addition, the yaw angle of the secondary coil which is displayed on the display unit is displayed as it is in the first display mode which constitutes the aspect where the alignment in the left-right direction is critical. Since the yaw angle of the secondary coil is dependent mainly on the accuracy with which the alignment in the left-right direction is executed, the driver of the electric vehicle can easily execute the alignment in the left-right direction with appropriate accuracy. On the other hand, in the case where the information is displayed on the display unit in the second display mode, since the yaw angle of the secondary coil is not displayed when the electric vehicle is reversed with the steered angle of the driving wheel held at 0 degree to move to the position where the secondary coil enters the target longitudinal zone, it is considered that the driver of the electric vehicle who watches the screen of the second display mode concentrates on the alignment in the front-rear direction and hence does nothing about the lateral operation As a result, it is possible to restrain the driver of the electric vehicle from changing the relative position in the left-right direction.

In addition, the target zone in aligning the secondary coil with the primary coil is displayed on the display unit in addition to the relative position and the yaw angle of the secondary coil. Due to this, the secondary coil can easily be aligned with the primary coil with appropriate accuracy by the driver operating the electric vehicle so that the secondary coil is included in the target zone while watching the screen of the display unit.

In addition, in the event that it is assumed that the secondary coil is not included in the target zone when the secondary coil is moved to approach the primary coil with the secondary coil included in the target lateral zone ($\Delta x < th1$), the driver is instructed to reduce gradually the steered angle $\theta$ of the driving wheels W to 0 degree and the yaw angle of the secondary coil is displayed on the display unit as it is. Namely, in the event that the secondary coil is displaced greatly in the left-right direction to go out of the target zone when the secondary coil is caused to approach the primary coil from the state where the secondary coil is included in the target lateral zone, the yaw angle of the secondary coil becomes the critical information for the driver. In this case, the driver of the electric vehicle is requested to execute an alignment operation with appropriate accuracy by displaying the secondary coil with the unchanged yaw angle on the display unit and instructing the driver to reduce gradually the steered angle $\theta$ to 0 degree. Consequently, the operator can align easily the secondary coil with the primary coil with appropriate accuracy.

On the other hand, in the event that it is assumed that the secondary coil is included in the target zone when the secondary coil is moved to approach the primary coil with the secondary coil included in the target lateral zone ($\Delta x < th1$), the driver is instructed to hold the steered angle $\theta$ as it is and the secondary coil is displayed on the display unit with the yaw angle reduced or deleted. Namely, in the event that the secondary coil is not displaced greatly in the left-right direction to stay in the target zone when the secondary coil is caused to approach the primary coil from the state where the secondary coil is included in the target lateral zone, the yaw angle of the secondary coil is no more the critical information for the driver. In this case, by displaying the secondary coil with the yaw angle reduced or deleted on the display unit and instructing the driver to hold the steered angle $\theta$ as it is, the driver is not requested to execute an alignment operation with excessive accuracy. Consequently, the operator can align easily the secondary coil with the primary coil with appropriate accuracy. In addition, by excluding reducing or deleting the yaw angle of the secondary coil from the information which is displayed on the display unit, it is considered that the driver of the electric vehicle who watches the screen of the display unit tends to concentrate on the longitudinal alignment and hence does nothing about the lateral operation. As a result, it is possible to restrain the driver of the electric vehicle from changing the relative position in the left-right direction.

In addition, the yaw angle of the secondary coil is calculated based on the information in which the change with time of the relative position of the secondary coil relative to the primary coil is resolved into the left-right direction and the front-rear direction. Consequently, the accurate yaw angle of the secondary coil can be acquired without using any special sensor.

When the change takes place from the state where the secondary coil is not included in the target lateral zone ($\Delta x \geq th1$) to the state where the secondary coil is included in the target lateral zone ($\Delta x < th1$), the driver of the electric vehicle can grasp the situation where the alignment of the secondary coil with the primary coil in relation to the left-right direction has been completed and hence, he or she only has to align the secondary coil with the primary coil only in relation to the front-rear direction by being given the notice on the steered angle. In addition, the driver can grasp the situation where he or she only has to align the secondary coil with the primary coil only in relation to the front-rear direction by being given the notice. Additionally, in the event that the driver of the electric vehicle is allowed to grasp the situation where he or she should execute only the alignment in relation to the front-rear direction by being given the notice, it is possible to suppress a risk of the driver of the electric vehicle changing the relative position in the left-right direction.

When the change takes place from the state where the secondary coil is not included in the target lateral zone ($\Delta x \geq th1$) to the state where the secondary coil is included in the target lateral zone ($\Delta x < th1$), the information in relation to the left-right direction is not displayed on the display unit. The driver of the electric vehicle can grasp the situation where the secondary coil is completely aligned with the primary coil in relation to the left-right direction and hence the secondary coil only has to be aligned with the primary coil in relation to the front-rear direction by watching the screen of the display unit which displays the relative position excluding the information on the relative position in relation to the left-right direction. In addition, by excluding the information on the relative position in relation to the left-right direction from the relative position that is to be displayed on the display unit, it is considered that the driver who watches the screen of the display unit tends to concentrate on the longitudinal alignment and hence does nothing about the lateral operation. As a result, it is possible to restrain the driver of the electric vehicle from changing the relative position in the left-right direction.

Since the yaw angle of the secondary coil is displayed by the figure, the driver of the electric vehicle can visually grasp the state of the secondary coil relative to the primary coil.

The invention is not limited to the embodiment which has been described heretofore and hence can be modified or improved as required. In the embodiment described herein, the power reception apparatus mounted on the electric vehicle and the power transmission apparatus disposed on the road surface or the like make up the power transmission and reception system for charging the battery of the electric vehicle, and the ECU 109 which the power reception apparatus includes executes the operations described above. However, the processing unit provided in the power transmission apparatus may execute similar operations. As this occurs, the information acquired by the processing unit of the power transmission apparatus executing the operations described above is transmitted from a transmitting unit to the electric vehicle to be displayed on the display unit 107 of the electric vehicle.

Although the electric vehicle described heretofore is the single motor EV (Electric Vehicle), the invention may also be applied to an HEV (Hybrid Electric Vehicle) or a PHEV (Plug-in Hybrid Electric Vehicle) on which at least one motor-generator is mounted together with an internal combustion engine.

DESCRIPTION OF REFERENCE NUMERALS AND CHARACTER

11 Primary coil
101 Drive part
103 Rectifier
105 Secondary coil
107 Display unit
109 ECU
111 Short range wireless unit
113 GPS processing unit
151 Battery
153 VCU
155 PDU
157 Motor-generator
159 Power steering unit
S Steering wheel
W Driving wheel

What is claimed is:

1. A power reception apparatus, comprising:
   a secondary coil which receives electric power in a non-contact manner from a primary coil which is disposed on a plane defined by a front-rear direction and a left-right direction which are at right angles to each other;
   a drive part for changing a relative position of the secondary coil on the plane relative to the primary coil;
   a display unit; and
   a processing unit for processing an image to be displayed on the display unit,
   wherein the processing unit determines a target zone on the plane which includes the primary coil,
   the processing unit calculates the relative position and a gradient of the secondary coil relative to the primary coil based on a coupling coefficient between the primary coil and the secondary coil, and a change with time in the coupling coefficient,
   the processing unit displays information on the relative position in relation to the front-rear direction and the left-right direction and information on the gradient of the secondary coil or a corrected gradient of the secondary coil on the display unit,
   the processing unit does not display information on the relative position in relation to the left-right direction on the display unit, in an event that the secondary coil is included in the target zone in relation to the left-right direction, and
   the processing unit changes a display mode of displaying the information on the relative position which is displayed on the display unit according to a change in the relative position in relation to the front-rear direction.

2. A power reception apparatus according to claim 1, wherein, in an event that the secondary coil is included in the target zone in relation to the left-right direction, the processing unit enlarges the display mode of displaying information on the relative position which is displayed on the display unit greater as a distance in the front-rear direction between the primary coil and the secondary coil which is represented by the relative position becomes shorter.

3. The power reception apparatus according to claim 1, wherein the processing unit displays information on the target zone on the display unit.

4. The power reception apparatus according to claim 1, wherein the processing unit calculates the gradient of the secondary coil based on a change with time in information on the relative position in relation to the left-right direction and a change with time in information on the relative position in relation to the front-rear direction.

5. The power reception apparatus according to claim 1, wherein in an event that the secondary coil is included in the target zone in relation to the left-right direction, the processing unit assumes whether or not the secondary coil is still included in the target zone in relation to the left-right direction based on the relative position and the gradient of the secondary coil when causing, in a state where the gradient of the secondary coil is maintained, the secondary coil to shift to a position where the secondary coil is included in the target zone in relation to the front-rear direction, and
   in an event that it assumes that the secondary coil is not included in the target zone, the processing unit displays the information on the relative position and the information on the gradient of the secondary coil on the display unit.

6. The power reception apparatus according to claim 1, wherein in an event that the secondary coil is included in the target zone in relation to the left-right direction, the processing unit assumes whether or not the secondary coil is still included in the target zone in relation to the left-right direction based on the relative position and the gradient of the secondary coil when causing, in a state where the gradient of the secondary coil is maintained, the secondary coil to shift to a position where the secondary coil is included in the target zone in relation to the front-rear direction, and
   in an event that it assumes that the secondary coil is included in the target zone, the processing unit displays the information on the relative position and information on reduced gradient of the secondary coil on the display unit.

7. The power reception apparatus according to claim 6, wherein the information on reduced gradient of the secondary coil is information indicating that a gradient of the secondary coil relative to the primary coil is almost 0 degree.

8. The power reception apparatus according to claim 1, wherein in an event that the secondary coil is included in the target zone in relation to the left-right direction, the processing unit processes to display information on the relative position in relation to the front-rear direction more than information on the relative position in relation to the left-right direction.

9. The power reception apparatus according to claim 1, wherein the information on the relative position includes information indicating the relative position by a figure, and the information on the gradient of the secondary coil or the corrected gradient of the secondary coil includes information indicating a gradient of the secondary coil relative to the primary coil by a figure.

10. A vehicle comprising the power reception apparatus according to claim 1.

11. A power reception apparatus, comprising:
a secondary coil which receives electric power in a non-contact manner from a primary coil which is disposed on a plane defined by a front-rear direction and a left-right direction which are at right angles to each other;
a drive part for changing a relative position of the secondary coil on the plane relative to the primary coil;
a display unit;
a processing unit for processing an image to be displayed on the display unit; and
an acquisition unit for acquiring information on a position of the primary coil and information on a position of the secondary coil,
wherein the processing unit determines a target zone on the plane which includes the primary coil,
the processing unit calculates the relative position and a gradient of the secondary coil relative to the primary coil based on each position information of the primary coil and the secondary coil which are acquired by the acquisition unit, and a change with time in the information on the positions of the primary and secondary coils,
the processing unit displays information on the relative position in relation to the front-rear direction and the left-right direction and information on the gradient of the secondary coil or a corrected gradient of the secondary coil on the display unit,
the processing unit does not display information on the relative position in relation to the left-right direction on the display unit, in an event that the secondary coil is included in the target zone in relation to the left-right direction, and
the processing unit changes a display mode of displaying the information on the relative position which is displayed on the display unit according to a change in the relative position in relation to the front-rear direction.

12. A power transmission apparatus, comprising:
a primary coil which transmits electric power to a secondary coil in a non-contact manner and is disposed on a plane defined by a front-rear direction and a left-right direction which are at right angles to each other;
a transmitter configured to transmit information to a power reception apparatus having a display unit; and
a processor configured to process an image to be displayed on the display unit of the power reception apparatus,
wherein the processor determines a target zone on the plane which includes the primary coil,
the processor calculates the relative position and a gradient of the secondary coil relative to the primary coil based on a coupling coefficient between the primary coil and the secondary coil, and a change with time in the coupling coefficient,
the transmitter transmits information on the relative position in relation to the front-rear direction and the left-right direction and information on the gradient of the secondary coil or a corrected gradient of the secondary coil to the display unit, a display mode of the display unit changes in response to the transmitter transmitting the information on the relative position which is displayed on the display unit according to a change in the relative position in relation to the front-rear direction, and in an event that the secondary coil is included in the target zone in relation to the left-right direction, the display unit does not display information on the relative position in relation to the left-right direction.

13. A power transmission apparatus, comprising:
a primary coil which transmits electric power to a secondary coil in a non-contact manner and is disposed on a plane defined by a front-rear direction and a left-right direction which are at right angles to each other;
a transmitter configured to transmit information to a power reception apparatus having a display unit;
a processor configured to process an image to be displayed on the display unit of the power reception apparatus, and acquire information on a position of the primary coil and information on a position of the secondary coil,
wherein the processor determines a target zone on the plane which includes the primary coil,
the processor calculates the relative position and a gradient of the secondary coil relative to the primary coil based on each position information of the primary coil and the secondary coil which are acquired by the acquisition unit, and a change with time in the information on the positions of the primary and secondary coils,
the transmitter transmits information on the relative position in relation to the front-rear direction and the left-right direction and information on the gradient of the secondary coil or a corrected gradient of the secondary coil to the display unit,
a display mode of the display unit changes in response to the transmitter transmitting the information on the relative position which is displayed on the display unit according to a change in the relative position in relation to the front-rear direction, and
in an event that the secondary coil is included in the target zone in relation to the left-right direction, the display unit does not display information on the relative position in relation to the left-right direction.

14. A power transmission and reception system, comprising:
a power transmission apparatus having a primary coil which is disposed on a plane defined by a front-rear direction and a left-right direction which are at right angles to each other;
a power reception apparatus having a secondary coil which receives electric power in a non-contact manner from the primary coil, wherein
the power reception apparatus comprises:
a drive part for changing a relative position of the secondary coil on the plane relative to the primary coil;
a display unit; and
a processing unit for processing an image to be displayed on the display unit,
wherein the processing unit determines a target zone on the plane which includes the primary coil,
the processing unit calculates the relative position and a gradient of the secondary coil relative to the primary coil based on a coupling coefficient between the primary coil and the secondary coil, and a change with time in the coupling coefficient, the processing unit displays information on the relative position in relation to the front-rear direction and the left-right direction and information on the gradient of the secondary coil or a corrected gradient of the secondary coil on the display unit, the processing unit does not display information on the relative position in relation to the left-right direction on the display unit, in an event that the secondary coil is included in the target zone in relation to the left-right direction, and the processing unit changes a display mode of displaying information on the relative position which is displayed on the display unit according to a change in the relative position in relation to the front-rear direction.

15. A power transmission and reception system, comprising:
a power transmission apparatus having a primary coil which is disposed on a plane defined by a front-rear direction and a left-right direction which are at right angles to each other;
a power reception apparatus having a secondary coil which receives electric power in a non-contact manner from the primary coil, wherein
the power reception apparatus comprises:
a drive part for changing a relative position of the secondary coil on the plane relative to the primary coil;
a display unit;
a processing unit for processing an image to be displayed on the display unit;
an acquisition unit for acquiring information on a position of the primary coil and information on a position of the secondary coil,
wherein the processing unit determines a target zone on the plane which includes the primary coil,
the processing unit calculates the relative position and a gradient of the secondary coil relative to the primary coil based on each position information of the primary coil and the secondary coil which are acquired by the acquisition unit, and a change with time in the information on the positions of the primary and secondary coils,
the processing unit displays information on the relative position in relation to the front-rear direction and the left-right direction and information on the gradient of the secondary coil or a corrected gradient of the secondary coil on the display unit,
the processing unit does not display information on the relative position in relation to the left-right direction on the display unit, in an event that the secondary coil is included in the target zone in relation to the left-right direction, and
the processing unit changes a display mode of displaying information on the relative position which is displayed on the display unit according to a change in the relative position in relation to the front-rear direction.

16. A control method for supporting an alignment in position of a secondary coil, which receives electric power in a non-contact manner from a primary coil which is disposed on a plane defined by a front-rear direction and a left-right direction which are at right angles to each other, with the primary coil by means of an image which is displayed on a display unit, comprising the steps of:
determining a target zone on the plane which includes the primary coil;
calculating a relative position of the secondary coil on the plane relative to the primary coil which is changed by a drive part for changing the relative position and a gradient of the secondary coil relative to the primary coil based on a coupling coefficient between the primary coil and the secondary coil, and a change with time in the coupling coefficient;
displaying information on the relative position in relation to the front-rear direction and the left-right direction and information on the gradient of the secondary coil or a corrected gradient of the secondary coil on the display unit; and
in an event that the secondary coil is included in the target zone in relation to the left-right direction, changing a display mode of displaying information on the relative position on the display unit according to a change in the relative position in relation to the front-rear direction without displaying information on the relative position in relation to the left-right direction on the display unit.

17. A control method for supporting an alignment in position of a secondary coil, which receives electric power in a non-contact manner from a primary coil which is disposed on a plane defined by a front-rear direction and a left-right direction which are at right angles to each other, with the primary coil by means of an image which is displayed on a display unit, comprising the steps of:
determining a target zone on the plane which includes the primary coil;
calculating a relative position of the secondary coil on the plane relative to the primary coil which is changed by a drive part for changing the relative position and a gradient of the secondary coil relative to the primary coil based on information on a position of the primary coil and information on a position of the secondary coil which are acquired by an acquisition unit for acquiring each position information of the primary coil and the secondary coil, and a change with time in the information on the positions of the primary and secondary coils;
displaying information on the relative position in relation to the front-rear direction and the left-right direction and information on the gradient of the secondary coil or a corrected gradient of the secondary coil on the display unit; and
in an event that the secondary coil is included in the target zone in relation to the left-right direction, changing a display mode of displaying the information on the relative position on the display unit according to a change in the relative position in relation to the front-rear direction without displaying information on the relative position in relation to the left-right direction on the display unit.

* * * * *